(12) United States Patent
Canham et al.

(10) Patent No.: US 10,090,513 B2
(45) Date of Patent: Oct. 2, 2018

(54) METHOD OF FORMING SILICON

(71) Applicant: Nexeon Limited, Oxfordshire (GB)

(72) Inventors: Leigh Canham, Worcestershire (GB); Christopher Michael Friend, Oxfordshire (GB); William James Macklin, Oxfordshire (GB); Scott Brown, Cambridgeshire (GB)

(73) Assignee: Nexeon Limited, Abingdon, Oxfordshire (GB)

( * ) Notice: Subject to any disclaimer, the term of this patent is extended or adjusted under 35 U.S.C. 154(b) by 856 days.

(21) Appl. No.: 14/403,478

(22) PCT Filed: Jun. 3, 2013

(86) PCT No.: PCT/GB2013/051472
§ 371 (c)(1),
(2) Date: Nov. 24, 2014

(87) PCT Pub. No.: WO2013/179068
PCT Pub. Date: Dec. 5, 2013

(65) Prior Publication Data
US 2015/0104705 A1    Apr. 16, 2015

(30) Foreign Application Priority Data
Jun. 1, 2012 (GB) .................... 1209843

(51) Int. Cl.
*C01B 33/023* (2006.01)
*H01M 4/134* (2010.01)
(Continued)

(52) U.S. Cl.
CPC .......... *H01M 4/134* (2013.01); *C01B 33/023* (2013.01); *H01M 4/386* (2013.01); *H01M 10/0525* (2013.01); *H01M 2004/027* (2013.01)

(58) Field of Classification Search
CPC .................... C01B 33/023; H01M 4/134
(Continued)

(56) References Cited

U.S. PATENT DOCUMENTS 4,002,541 A   1/1977 Streander
4,192,720 A   3/1980 Bucker et al.
(Continued)

FOREIGN PATENT DOCUMENTS

CN    1569623        1/2005
CN    1967910 A      5/2007
(Continued)

OTHER PUBLICATIONS

Cui, et al. Doping and Electrical Transport in Silicon Nanowires, Journal of Physical Chemistry, 104(22):5213-5216 (2000).
(Continued)

*Primary Examiner* — Melvin C. Mayes
*Assistant Examiner* — Michael Forrest
(74) *Attorney, Agent, or Firm* — William R. Haulbrook; Michael D. Schmitt; Choate, Hall & Stewart LLP

(57) ABSTRACT

A method of forming a particulate material comprising silicon, the method comprising the step of reducing a particulate starting material comprising silica-containing particles having an aspect ratio of at least 3:1 and a smallest dimension of less than 15 microns, or reducing a particulate starting material comprising silica-containing particles comprising a plurality of elongate structural elements, each elongate structural element having an aspect ratio of at least 3:1 and a smallest dimension of less than 15 microns.

33 Claims, 12 Drawing Sheets

(51) Int. Cl.
   *H01M 4/38* (2006.01)
   *H01M 4/02* (2006.01)
   *H01M 10/0525* (2010.01)

(58) Field of Classification Search
   USPC .......................................................... 423/349
   See application file for complete search history.

(56) References Cited

U.S. PATENT DOCUMENTS

| | | |
|---|---|---|
| 4,363,708 A | 12/1982 | Rauchle et al. |
| 4,686,013 A | 8/1987 | Pensabene et al. |
| 5,395,711 A | 3/1995 | Tahara et al. |
| 5,514,495 A | 5/1996 | Klaus |
| 5,658,691 A | 8/1997 | Suzuki et al. |
| 5,914,183 A | 6/1999 | Canham |
| 6,132,724 A | 10/2000 | Blum |
| 6,190,951 B1 | 2/2001 | Nakahori et al. |
| 6,334,939 B1 | 1/2002 | Zhou et al. |
| 6,514,395 B2 | 2/2003 | Zhou et al. |
| 7,138,208 B2 | 11/2006 | Tanjo et al. |
| 7,244,513 B2 | 7/2007 | Li et al. |
| 7,311,999 B2 | 12/2007 | Kawase et al. |
| 7,332,339 B2 | 2/2008 | Canham |
| 7,402,829 B2 | 7/2008 | Green |
| 7,479,351 B2 | 1/2009 | Matsubara et al. |
| 7,615,206 B2 | 11/2009 | Sandhage et al. |
| 7,638,239 B2 | 12/2009 | Sato et al. |
| 7,713,849 B2 | 5/2010 | Habib et al. |
| 7,824,801 B2 | 11/2010 | Kogetsu et al. |
| 7,851,086 B2 | 12/2010 | Matsubara et al. |
| 7,879,734 B2 | 2/2011 | Fukutani et al. |
| 8,080,337 B2 | 12/2011 | Higuchi et al. |
| 8,526,166 B2 | 9/2013 | Choi et al. |
| 8,585,918 B2 | 11/2013 | Green et al. |
| 8,597,831 B2 | 12/2013 | Green et al. |
| 8,772,174 B2 | 7/2014 | Green et al. |
| 8,940,192 B2 | 1/2015 | Toyokawa |
| 8,940,437 B2 | 1/2015 | Green et al. |
| 8,945,431 B2 | 2/2015 | Schulz et al. |
| 9,252,426 B2 | 2/2016 | Green |
| 9,548,489 B2 | 1/2017 | Abdelsalam et al. |
| 2001/0044045 A1 | 11/2001 | Sato et al. |
| 2002/0037433 A1 | 3/2002 | Rasmussen et al. |
| 2002/0074972 A1 | 6/2002 | Narang et al. |
| 2002/0121460 A1 | 9/2002 | Moy et al. |
| 2002/0148727 A1 | 10/2002 | Zhou et al. |
| 2002/0164479 A1 | 11/2002 | Matsubara et al. |
| 2003/0099883 A1 | 5/2003 | Ochoa et al. |
| 2003/0150378 A1 | 8/2003 | Winterton et al. |
| 2004/0052867 A1 | 3/2004 | Canham |
| 2004/0140222 A1 | 7/2004 | Smedley et al. |
| 2004/0166319 A1 | 8/2004 | Li et al. |
| 2004/0214085 A1 | 10/2004 | Sheem et al. |
| 2005/0186378 A1 | 8/2005 | Bhatt |
| 2005/0186474 A1 | 8/2005 | Jiang et al. |
| 2006/0019151 A1 | 1/2006 | Imachi et al. |
| 2006/0099495 A1 | 5/2006 | Suzuki et al. |
| 2006/0147802 A1 | 7/2006 | Yasuda et al. |
| 2006/0166098 A1* | 7/2006 | Tabuchi ............... H01M 4/134 429/232 |
| 2006/0216603 A1 | 9/2006 | Choi |
| 2006/0251561 A1 | 11/2006 | Farrell et al. |
| 2007/0011102 A1 | 1/2007 | Matsuhira et al. |
| 2007/0020521 A1 | 1/2007 | Obrovac et al. |
| 2007/0031733 A1 | 2/2007 | Kogetsu et al. |
| 2007/0054190 A1 | 3/2007 | Fukui et al. |
| 2007/0077490 A1 | 4/2007 | Kim et al. |
| 2007/0099081 A1 | 5/2007 | Matsuda et al. |
| 2007/0111101 A1 | 5/2007 | Ohkubo et al. |
| 2007/0111102 A1 | 5/2007 | Inoue et al. |
| 2007/0224508 A1 | 9/2007 | Aramata et al. |
| 2007/0255198 A1 | 11/2007 | Leong et al. |
| 2007/0281216 A1 | 12/2007 | Petrat et al. |
| 2008/0038170 A1 | 2/2008 | Sandhage et al. |
| 2008/0062616 A1 | 3/2008 | Matsuda et al. |
| 2008/0096110 A1 | 4/2008 | Bito et al. |
| 2008/0113269 A1 | 5/2008 | Yamamoto et al. |
| 2008/0124631 A1 | 5/2008 | Fukui et al. |
| 2008/0145757 A1 | 6/2008 | Mah et al. |
| 2008/0166474 A1 | 7/2008 | Deguchi et al. |
| 2008/0261112 A1 | 10/2008 | Nagata et al. |
| 2008/0280207 A1 | 11/2008 | Patoux et al. |
| 2009/0004566 A1 | 1/2009 | Shirane et al. |
| 2009/0004568 A1 | 1/2009 | Hirose et al. |
| 2009/0010833 A1 | 1/2009 | Rosenband et al. |
| 2009/0137688 A1 | 5/2009 | Yang |
| 2009/0143227 A1 | 6/2009 | Dubrow et al. |
| 2009/0169985 A1 | 7/2009 | Yamaguchi et al. |
| 2009/0186267 A1 | 7/2009 | Tiegs |
| 2009/0253033 A1 | 10/2009 | Hirose et al. |
| 2009/0301866 A1 | 12/2009 | Zaghib et al. |
| 2010/0008841 A1 | 1/2010 | Rosenkilde |
| 2010/0112442 A1 | 5/2010 | Fujikawa et al. |
| 2010/0112451 A1 | 5/2010 | Shibutani et al. |
| 2010/0112475 A1 | 5/2010 | Natsume et al. |
| 2010/0143773 A1 | 6/2010 | Honbou |
| 2010/0143798 A1 | 6/2010 | Zhamu et al. |
| 2010/0178565 A1 | 7/2010 | Green |
| 2010/0190061 A1 | 7/2010 | Green |
| 2010/0196760 A1 | 8/2010 | Green |
| 2010/0243951 A1 | 9/2010 | Watanabe et al. |
| 2010/0266902 A1 | 10/2010 | Takano et al. |
| 2010/0278931 A1 | 11/2010 | Ashton et al. |
| 2010/0285358 A1 | 11/2010 | Cui et al. |
| 2010/0291441 A1 | 11/2010 | Ugaji et al. |
| 2010/0297502 A1 | 11/2010 | Zhu et al. |
| 2010/0330418 A1 | 12/2010 | Liang et al. |
| 2010/0330425 A1 | 12/2010 | Lopatin et al. |
| 2011/0008531 A1 | 1/2011 | Mikhaylik et al. |
| 2011/0027537 A1 | 2/2011 | Inoue et al. |
| 2011/0039690 A1 | 2/2011 | Niu |
| 2011/0056563 A1 | 3/2011 | Bari |
| 2011/0067228 A1 | 3/2011 | Green |
| 2011/0076560 A1 | 3/2011 | Scordilis-Kelley et al. |
| 2011/0085960 A1 | 4/2011 | Mukasyan et al. |
| 2011/0104480 A1 | 5/2011 | Malekos et al. |
| 2011/0111135 A1 | 5/2011 | Kamiyama et al. |
| 2011/0111279 A1 | 5/2011 | Smithyman et al. |
| 2011/0123866 A1 | 5/2011 | Pan et al. |
| 2011/0163274 A1 | 7/2011 | Plee et al. |
| 2011/0236493 A1 | 9/2011 | Canham et al. |
| 2011/0244328 A1 | 10/2011 | Iriyama et al. |
| 2011/0250498 A1 | 10/2011 | Green et al. |
| 2011/0269019 A1 | 11/2011 | Green et al. |
| 2011/0281180 A1 | 11/2011 | Kim et al. |
| 2011/0287318 A1 | 11/2011 | Loveness et al. |
| 2011/0299223 A1 | 12/2011 | Oh et al. |
| 2012/0040242 A1 | 2/2012 | Kurasawa et al. |
| 2012/0094178 A1* | 4/2012 | Loveridge ............. H01M 4/134 429/217 |
| 2012/0100438 A1 | 4/2012 | Fasching et al. |
| 2012/0107688 A1 | 5/2012 | Loveridge |
| 2012/0121999 A1 | 5/2012 | Laurencin et al. |
| 2012/0171566 A1 | 7/2012 | Yoshitake et al. |
| 2012/0255858 A1 | 10/2012 | Maeshima et al. |
| 2012/0315543 A1 | 12/2012 | Wata et al. |
| 2013/0196158 A1 | 8/2013 | Yoshida et al. |
| 2013/0216907 A1 | 8/2013 | Rayner et al. |
| 2013/0224583 A1 | 8/2013 | Green |
| 2014/0147751 A1 | 5/2014 | Yang et al. |
| 2014/0162131 A1 | 6/2014 | Friend et al. |
| 2014/0170303 A1 | 6/2014 | Rayner et al. |
| 2014/0193711 A1 | 7/2014 | Biswal et al. |
| 2014/0235884 A1 | 8/2014 | Veinot et al. |
| 2014/0349183 A1 | 11/2014 | Macklin et al. |
| 2015/0044571 A1 | 2/2015 | Abdelsalam et al. |
| 2015/0280221 A1 | 10/2015 | Abdelsalam et al. |
| 2016/0172670 A1 | 6/2016 | Friend |
| 2016/0197342 A1 | 7/2016 | Lee et al. |
| 2016/0308205 A1 | 10/2016 | Canham et al. |
| 2017/0133674 A1 | 5/2017 | Murphy et al. |

(56) References Cited

U.S. PATENT DOCUMENTS

| | | |
|---|---|---|
| 2017/0200939 A1 | 7/2017 | Murphy et al. |
| 2017/0346079 A1 | 11/2017 | Friend et al. |

FOREIGN PATENT DOCUMENTS

| | | |
|---|---|---|
| CN | 101188281 A | 5/2008 |
| CN | 101335342 A | 12/2008 |
| CN | 101442124 A | 5/2009 |
| CN | 101471457 A | 7/2009 |
| CN | 101591478 A | 12/2009 |
| CN | 102157731 A | 8/2011 |
| CN | 103 165 870 A | 6/2013 |
| CN | 103 633 295 A | 3/2014 |
| CN | 103840140 A | 6/2014 |
| EP | 0281115 A2 | 9/1988 |
| EP | 1335438 A1 | 8/2003 |
| EP | 1427039 A2 | 6/2004 |
| EP | 1750314 A1 | 2/2007 |
| EP | 1791199 A1 | 5/2007 |
| EP | 2037516 A1 | 3/2009 |
| EP | 2051317 A1 | 4/2009 |
| EP | 2383224 A1 | 11/2011 |
| EP | 2509142 A1 | 10/2012 |
| EP | 2873646 A1 | 5/2015 |
| EP | 2533331 B1 | 8/2015 |
| GB | 980513 A | 1/1965 |
| GB | 2000191 A | 1/1979 |
| GB | 2395059 A | 5/2004 |
| GB | 2464158 A | 4/2010 |
| GB | 2470056 A | 11/2010 |
| GB | 2483372 A | 3/2012 |
| GB | 2495951 A | 5/2013 |
| JP | 06-325765 A | 11/1994 |
| JP | 11-250896 | 9/1999 |
| JP | 2001-266866 A | 9/2001 |
| JP | 2002-151055 A | 5/2002 |
| JP | 2003-077463 A | 3/2003 |
| JP | 2003-303586 A | 10/2003 |
| JP | 2004-185984 A | 7/2004 |
| JP | 2004/214054 A | 7/2004 |
| JP | 2004281317 A | 10/2004 |
| JP | 2005-63955 A | 3/2005 |
| JP | 03714665 B2 | 11/2005 |
| JP | 2006-100244 A | 4/2006 |
| JP | 2006172860 A | 6/2006 |
| JP | 2006-269216 A | 10/2006 |
| JP | 2007-294423 A | 11/2007 |
| JP | 2007-335283 A | 12/2007 |
| JP | 2007318057 A | 12/2007 |
| JP | 2007335198 A | 12/2007 |
| JP | 2008-166013 A | 7/2008 |
| JP | 2008186732 A | 8/2008 |
| JP | 2008-293872 A | 12/2008 |
| JP | 2008305746 A | 12/2008 |
| JP | 2010205609 A | 9/2010 |
| JP | 2011-009228 A | 1/2011 |
| JP | 2011-192629 A | 9/2011 |
| JP | 2011/198614 A | 10/2011 |
| JP | 2012084521 A | 4/2012 |
| JP | 2012084522 A | 4/2012 |
| KR | 2008-0091883 A | 10/2008 |
| KR | 2013 0107892 A | 10/2013 |
| KR | 20140070227 A | 6/2014 |
| SU | 471402 A1 | 3/1973 |
| SU | 544019 A | 7/1975 |
| WO | WO-97/01193 A1 | 1/1997 |
| WO | WO-2005/075048 A1 | 8/2005 |
| WO | WO-2005/096414 A2 | 10/2005 |
| WO | WO-2006/068066 A1 | 6/2006 |
| WO | WO-2006/097380 A1 | 9/2006 |
| WO | WO-2006/135375 A2 | 12/2006 |
| WO | WO-2007/037787 A1 | 4/2007 |
| WO | WO-2007/083152 A1 | 7/2007 |
| WO | WO-2007/083155 A1 | 7/2007 |
| WO | WO-2007/094641 A1 | 8/2007 |
| WO | WO-2008/044683 A1 | 4/2008 |
| WO | WO-2009/010758 A2 | 1/2009 |
| WO | WO-2009/010759 A1 | 1/2009 |
| WO | WO-2009/033082 A2 | 3/2009 |
| WO | WO-2009/050585 A1 | 4/2009 |
| WO | WO-2009/063801 A1 | 5/2009 |
| WO | WO-2009/089018 A2 | 7/2009 |
| WO | WO-2009/128800 A1 | 10/2009 |
| WO | WO-2010/026332 A1 | 3/2010 |
| WO | WO-2010/040985 A1 | 4/2010 |
| WO | WO-2010/128310 A1 | 11/2010 |
| WO | WO-2010/130975 A1 | 11/2010 |
| WO | WO-2010/130976 A1 | 11/2010 |
| WO | WO-2010/139987 A2 | 12/2010 |
| WO | WO-2011/042742 A1 | 4/2011 |
| WO | WO-2011/117436 A1 | 9/2011 |
| WO | WO-2012/028857 A1 | 3/2012 |
| WO | WO-2012/084570 A1 | 6/2012 |
| WO | WO-2012/093224 A1 | 7/2012 |
| WO | WO-2012/175998 A1 | 12/2012 |
| WO | WO-2013/021630 A1 | 2/2013 |
| WO | WO-2013/024305 A2 | 2/2013 |
| WO | WO-2013/114094 A1 | 8/2013 |
| WO | WO-2013/128201 A2 | 9/2013 |
| WO | WO-2013/140177 A2 | 9/2013 |
| WO | WO-2013/146658 A1 | 10/2013 |
| WO | WO-2013/179068 A2 | 12/2013 |
| WO | WO-2013/179068 A3 | 1/2014 |
| WO | WO-2014/068318 A1 | 5/2014 |
| WO | WO-2015/041450 A1 | 3/2015 |
| WO | WO-2015/082920 A1 | 6/2015 |

OTHER PUBLICATIONS

Cullis et al., Structural and Luminescence properties of porous silicon, Applied Physics Reviews, 82(3):909-965 (1997).
Gao, B, Synthesis and Electrochemical Properties of Carbon Nanotubes and Silicon Nanowires, Ph.D. Thesis in Applied and Material Sciences, University of North Carolina Chapel Hill (2001).
GB Patent Application No. 0601319.7, filed Jan. 23, 2006, 14 pages.
Jung, K. H. et al., Developments in Luminescent Porous Si, J. Electrochem. Soc., 140(10):3046-3064 (1993).
Kuriyama, K. et al., Anomalous electrical resistivity and photovoltaic phenomenon in the fast mixed conductor lithium silicide $Li_{12}Si_{17}$, Physical Review, 38(18):1436-38 (1988).
Li, H. et al., The crystal structural evolution of nano-Si anode caused by lithium insertion and extraction at room temperature, Solid State Ionics 135:181-191 (2000).
Meijer, J.A. et al., Electrical resistivity and 7Li Knight shift of liquid Li—Si alloys, J. Phys. Condens. Matter I, 5283-5289 (1989).
Merriam Webster, Definition of Particle, 1 page.
Morales, Alfredo M. and Lieber, Charles M., A Laser Ablation Method for the Synthesis of Crystalline Semiconductor Nanowires, Science, 279(9):208-211 (1998).
Shih, S. et al., Transmission electron microscopy study of chemically etched porous Si, Applied Physical Letters, 62(5):467-69 (1993).
Sinha, S. et al., Synthesis of Silicon Nanowires and Novel Nano-Dendrite Structures, CP544 Electronic Properties of Novel Materials Molecular Nanostructures, 431-436 (2000).
Sinha, S. et al., Synthesis of silicon nanowires and novel nano-dendrite structures, Journal of Nanoparticle Research 6: 421-425 (2004).
Tarascon, J M. et al., An update of the Li metal-free rechargeable battery based on $Li_{1+x}Mn_2O_4$ cathodes and carbon anodes, Journal of Power Sources, 43-44:689-700 (1993).
Van Schalkwijk, Walter A. and Scrosati, Bruno, Advances in Lithium-Ion Batteries (edited 2002 Excerpts).
Wakihara, M., Recent development in lithium ion batteries, Materials Science and Engineering, R33:109-134 (2001).
Winter, Martin and Brodd, Ralph J., Batteries versus Fuel Cells versus Electrochemical Capacitors, Chem. Rev. 104:4245-4269 (2004).
Zhang, Sheng Shui, A review on electrolyte additives for lithium-ion batteries, Journal of Power Sources, 162:1379-1394 (2006).

(56) References Cited

OTHER PUBLICATIONS

Zhou, G. W. et al., Controlled Li doping of Si nanowires by electrochemical insertion methods, Applied Physics Letters, 75(16):2447-2449 (1999).
Bang, B.M. et al., Scalable Approach to Multi-Dimensional Bulk Si Anodes via Metal-Assisted Chemical Etching, Energy & Environmental Science, 4:5013-5019 (2011).
Chartier, C. et al., Metal-assisted chemical etching of silicon in HF-H2O2, Electrochimica Acta, 53(17):5509-5516 (2008).
Chen, X. et al., A Patterned 3D Silicon Anode Fabricated by Electrodeposition on a Virus-Structured Current Collector, Advanced Function Materials, 21:380-387 (2011).
Graetz, J. et al., Highly reversible lithium storage in nanostructured silicon, Journal of the Electrochemical Society, 6(9):194-197 (2003).
Hatchard, T. D. and Dahn, J. R., In Situ XRD and Electrochemical Study of the Reaction of Lithium with Amorphous Silicon, Journal of the Electrochemical Society, 151(6):A838-A842 (2004).
Huang, Z. et al., Metal-Assisted Chemical Etching of Silicon: A Review, Adv. Mater. 23:285-308 (2011).
Lestriez, B. et al., Hierarchical and Resilient Conduction Network of Bridged Carbon Nanotubes and Nanofibers for High-Energy Si Negative Electrodes, Electrochemical and Solid-State Letters, 12(4):76-80 (2009).
Mallet, J. et al., Growth of silicon nanowires of controlled diameters by electrodeposition in ionic liquid at room temperature, Nanoletters, 8(10):3468-3474 (2008).
Oudenhoven, Jos F. M. et al., All-solid-State Lithium-Ion Microbatteries: A Review of Various Three-Dimensional Concepts, Adv. Energy Mater. 1:10-33 (2011).
Robinson, D. and Walsh, F.C., The Performance of a 500 Amp Rotating Cylinder Electrode Reactor. Part 1: Current-Potential Data and Single Pass Studies, Hydrometallurgy, 26:93 (1991).
Rongguan, L. et al., Electrodeposited porous-microspheres Li—Si films as negative electrodes in lithium-ion batteries, Journal of Power Sources, 196(8):3868-3873 (2011).
Schmuck, M. et al, Alloying of electrodeposited silicon with lithium—A principal study of applicability as a node material for lithium ion batteries, J. Solid State Electrochem, 14:2203-2207 (2010).
Shin, H. C. et al., Nanoporous Structures Prepared by an Electrochemical Deposition Process, Advanced Materials, 15:19, 1610-1614 (2003).
Teschke, O. et al., Test cell simulating the operating conditions of water electrolysers for the evaluation of gas evolving electrocatalysts, Journal of Applied Electrochemistry, 13(3):371-376 (1983).
Wachtler, M. et al., Anodic materials for rechargeable Li-batteries, Journal of Power Sources 105:151-160 (2002).
Winter, M. et al., Insertion Electrode Materials for Rechargeable Lithium Batteries, Adv. Mater. 10(10):725-763 (1988).
Xiao, et al., Stabilization of Silicon Anode for Li-ion Batteries, Journal of the Electrochemical Society, 157(10):1047-1051 (2010).
Yang, J. et al., Si/c composites for high capacity lithium storage materials, Journal of the Electrochemical Society, 6(8):154-156 (2003).
Chen et al., Mesoporous Silicon Anodes Prepared by Magnesiothermic Reduction for Lithium Ion Batteries, Journal of the Electrochemical Society, 158(9):A1055-A1059 (2011).
Choi et al., Silica nanofibres from electrospinning/sol-gel process, J. Mater. Sci. Letters, 22:891-893 (2003).
International Search Report, PCT/GB2013/051472, dated Oct. 12, 2013, 8 pages.
Jia et al., Novel Three-Dimensional Mesoporous Silicon for High Power Litium-Ion Battery Anode Material, Advs. Energy Mater., 1:1036-1039 (2011).
Krissanasaeranee et al., Preparation of Ultra-Fine Silica Fibers Using Electrospun Ply(Vinyl Alcohol)/Silatrane Composite Fibers as Precursor, J. Am. Ceram. Soc., 91(9):2830-2835 (2008).
Ma et al., Silver nanoparticles decorated, flexible $SiO_2$ nanofibers with long-term antibacterial effect as reusable wound cover, Colloids and Surfaces A: Physicochem. Eng. Aspects 387:57-64 (2011).
Purkid et al., Synthesis and Characterization of $SiO_2$ Nanowires Prepared from Rice Husk Ash, J. Metals, Materials and Minerals, 19(2):33-37 (2009).
Richman et al., Ordered Mesoporous Silicon through Magensium Reduction of Polymer Templated Silica Thin Films, Nano Lett., 8(9):3075-3079 (2008).
United Kingdom Search Report, GB1209843.0, dated Jul. 23, 2012, 1 page.
Yu et al., Reversible Storage of Lithium in Silver-Coated Three-Dimensional Macroporous Silicon, Adv. Mater., 22:2247-2250 (2010).
Zhang et al., Vapor-induced solid-liquid-solid process for silicon-based nanowire growth, Journal of Power Sources 195:1691-1697 (2010).
U.S. Appl. No. 14/128,365, Friend, filed Feb. 10, 2014.
U.S. Appl. No. 14/236,309, Rayner, filed Jan. 30, 2014.
U.S. Appl. No. 14/371,814, Abdelsalam, filed Jul. 11, 2014.
U.S. Appl. No. 14/371,837, Abdelsalam, filed Jul. 11, 2014.
U.S. Appl. No. 14/371,822, Macklin, filed Jul. 11, 2014.
U.S. Appl. No. 14/436,186, Abdelsalam, filed Apr. 16, 2015.
U.S. Appl. No. 14/907,425, Friend, filed Jan. 25, 2016.
U.S. Appl. No. 15/101,209, Canham, filed Jun. 2, 2016.
Webb, P.A. and Orr, C., Modern Methods of Particle Characterization, Micromeritics, 17 pages (1998).
Gao et al., Alloy formation in Nanostructured Silicon, Journal of Advanced Materials, 13(11):816-819 (2001).
International Search Report, PCT/GB2014/053594, 6 pages, dated May 22, 2015.
Notice of Opposition, EP 2533331 B1, 6 pages, dated May 27, 2016.
Ohara, S. et al., A thin film silicon anode for Li-ion batteries having a very large specific capacity and long cycle life, Journal of Power Sources, (136):303-306 (2004).
Jia et al., Supporting Information for Advs. Energy Mater., DOI: 10.1002/aenm.201100485: Novel Three-Dimensional Mesoporous Silicon for High Power Litium-Ion Battery Anode Material, Advanced Energy Materials, DOI: 10.1002/aenm.201100485, 4 pages, (2011).
Ren, W. et al., Preparation of porous silicon/carbon microspheres as high performance anode materials for lithium ion batteries, Journal of Materials Chemistry A: Materials for Energy and Sustainability, 3(11):5859-5865 (2015).

\* cited by examiner

METHOD OF FORMING SILICON

CROSS-REFERENCE TO RELATED APPLICATION

This patent application is a National Stage Entry of International Patent Application No. PCT/GB2013/051472, filed on Jun. 3, 2013; this patent application claims priority to GB 1209843.0, filed on Jun. 1, 2012, the entire contents of both of which are hereby incorporated by reference herein.

BACKGROUND

Rechargeable metal-ion batteries, for example lithium ion batteries, are extensively used in portable electronic devices such as mobile telephones and laptops, and are finding increasing application in electric or hybrid electric vehicles.

Rechargeable metal ion batteries have an anode layer; a cathode layer capable of releasing and re-inserting metal ions; and an electrolyte between the anode and cathode layers. When the battery cell is fully charged, metal ions have been transported from the metal-ion-containing cathode layer via the electrolyte into the anode layer. In the case of a graphite-based anode layer of a lithium ion battery, the lithium reacts with the graphite to create the compound $Li_xC_6$ ($0<=x<=1$). The graphite, being the electrochemically active material in the composite anode layer, has a maximum capacity of 372 mAh/g.

The use of a silicon-based active anode material, which may have a higher capacity than graphite, is also known. Silicon may be provided in the form of fibres.

WO 2009010758 discloses a process of forming silicon fibres by a first step of anisotropic etching of silicon particles to form a particle having a silicon core with silicon pillars extending from the core, and a second step of detaching the pillars from the pillared particle core by scraping, agitating or chemical etching of the pillared particle.

It will be appreciated that the yield of silicon fibres produced by this method as a percentage of the mass of the starting material is limited because the silicon of the starting material that is etched away in the first etching step cannot contribute to the mass of the silicon fibre product. It may also be the case that not all of the remaining silicon core can be recycled to produce further fibre so that this too cannot contribute to the mass of the fibre product. Furthermore, the silicon particles forming the starting material are not naturally available and must be manufactured using industrial processes that increase the cost and carbon footprint.

Jia et al, "Novel Three-Dimensional Mesoporous Silicon for High Power Lithium-Ion Battery Anode Material", Adv. Energy Mater. 2011, 1, 1036-1039 and Chen et al, "Mesoporous Silicon Anodes Prepared by Magnesiothermic Reduction for Lithium Ion Batteries", Journal of The Electrochemical Society, 158 (9) A1055-A1059 (2011) disclose formation of mesoporous silicon by magnesiothermic reduction of a silica template.

Yu et al, "Reversible Storage of Lithium in Silver-Coated Three-Dimensional Macroporous Silicon", Adv, Mater, 2010, 22, 2247-2250, discloses magnesiothermic reduction of silica powder.

Richman et al, "Ordered Mesoporous Silicon through Magnesium Reduction of Polymer Templated Silica Thin Films", Nano Lett., Vol. 8, No. 9, 2008, 3075-3079 a process of producing mesoporous silica ($SiO2$) thin films via evaporation induced self-assembly (EISA) using sol-gel silica precursors with a diblock copolymer template, followed by reduction of the silica to silicon by magnesium vapour.

It is an object of the invention to provide a method of forming elongate silicon-comprising structures.

It is a further objection of the invention to provide a high yielding method of forming structured particles containing elongate silicon-comprising structures as elements of the structured particles.

It is a further object of the invention to provide a sustainable method of forming elongate silicon-comprising structures on a large scale.

It is a further object of the invention to provide a method of forming elongate silicon-comprising structures with certain shape, form and dimensional characteristics that provide performance improvements in their application yet are not otherwise easily manufactured in bulk by other methods.

SUMMARY OF THE INVENTION

In a first aspect the invention provides a method of forming a particulate material comprising silicon, the method comprising the step of reducing a particulate starting material comprising silica-containing particles having an aspect ratio of at least 3:1 and a smallest dimension of less than 15 microns, or reducing a particulate starting material comprising silica-containing particles comprising a plurality of elongate structural elements, each elongate structural element having an aspect ratio of at least 3:1 and a smallest dimension of less than 15 microns.

Optionally, the aspect ratio of the silica-containing particles or of the elongate structural elements is at least 5:1.

Optionally, the smallest dimension of the silica-containing particles or of the elongate structural elements is less than 10 microns.

Optionally, the smallest dimension of the silica-containing particles or of the elongate structural elements is less than 3 microns.

Optionally, substantially all silica of the starting material is reduced.

Optionally, the geometric surface area of the silicon material is substantially the same as the geometric surface area of the starting material.

Optionally, silica at a surface of the starting material particles is reduced and silica at a core of the starting material particles is not reduced.

Optionally, the silica at the core is selectively removed.

Optionally, the silica at the core is selectively removed by exposure to HF.

Optionally, the particulate material comprising silicon formed following selective removal of silica is a flake having a hollow core, or a tube.

Optionally, the geometric surface area of the material comprising silicon is greater than the geometric surface area of the starting material.

Optionally, the shape of the particles of the material comprising silicon is substantially the same as the shape of the starting material particles.

Optionally, the starting material is n- or p-doped.

Optionally, the starting material is undoped.

Optionally, the starting material particles have an open framework structure.

Optionally, the starting material is reduced at a reaction temperature of no more than 750° C., optionally no more than 650° C.

Optionally, the starting material is reduced by exposure to liquid metal or metal vapour.

Optionally, the metal is magnesium or calcium.

Optionally, the reduction takes place in the presence of a thermal moderator, optionally a salt.

Optionally, the thermal moderator is mixed with the starting material and a reducing agent.

Optionally, a layer of thermal moderator is in contact with the starting material.

Optionally, the silica is reduced by exposure to a reducing composition that causes both reduction of the silica and doping of the silicon.

Optionally, the method comprises the further step of coating at least part of the surface of the material comprising silicon.

Optionally, at least part of the surface of the material comprising silicon is coated with silicon oxide or carbon.

Optionally, the starting material is formed by electrospinning silica.

Optionally, the starting material is formed by electrospinning silica onto a patterned collector defining a shape for the starting material.

Optionally, silica is electrospun with a polymer.

Optionally, silica only is electrospun.

Optionally, the starting material is biogenic silica.

Optionally, the starting material has a substantially enclosed void volume and the smallest dimension is a thickness of a wall of the starting material enclosing the void volume.

Optionally, the smallest dimension of the starting material is an external thickness of the starting material.

Optionally, the material comprising silicon has a BET value that is the same as or less than a BET value of the starting material.

Optionally, the material comprising silicon has a BET value of less than 100 $m^2/g$.

Optionally, the starting material is no more than 95% silica by weight.

Optionally, the starting material is no more than 90% silica by weight.

Optionally, the particulate material comprising silicon is treated to remove reaction by-products.

Optionally, reaction by-products are removed by HCl treatment.

Optionally, the particulate material comprising silicon is etched to form silicon pillars extending from a silicon core of the particulate material.

Optionally, the particulate material comprising silicon is etched by metal-assisted chemical etching.

In a second aspect the invention provides a particulate material comprising silicon obtainable by a method according to any preceding claim.

In a third aspect the invention provides an electrode comprising an active material of a material comprising silicon according to the second aspect.

Optionally according to the third aspect, the electrode further comprises a conductive current collector in electrical contact with the active material.

In a fourth aspect the invention provides a slurry comprising a particulate material comprising silicon according to the second aspect and at least one solvent.

In a fifth aspect the invention provides a method of forming an electrode according to the third aspect, the method comprising the step of depositing onto the conductive current collector a slurry according to the fourth aspect, and evaporating the solvent.

In a sixth aspect the invention provides a rechargeable metal ion battery comprising an anode, the anode comprising an electrode according to the third aspect capable of inserting and releasing metal ions; a cathode formed from a metal-containing compound capable of releasing and reabsorbing the metal ions; and an electrolyte between the anode and the cathode.

Optionally according to the sixth aspect the metal ion battery is a lithium ion battery.

In a seventh aspect the invention provides a method of forming a material comprising silicon comprising the steps of electrospinning a material comprising silica and reducing the electrospun material comprising silica.

Optionally according to the seventh aspect, the electrospun material comprising silica to be reduced comprises silica-containing particles having an aspect ratio of at least 3:1, optionally at least 5:1 and a smallest dimension of less than 15 microns, optionally less than 3 microns, or reducing a particulate starting material comprising silica-containing particles comprising a plurality of elongate structural elements, each elongate structural element having an aspect ratio of at least 3:1, optionally at least 5:1 and an smallest dimension of less than 15 microns, optionally less than 3 microns.

In an eighth aspect the invention provides a method of forming silicon comprising the step of reducing biogenic silica.

Optionally according to the eighth aspect, the electrospun silica to be reduced comprises silica-containing particles having an aspect ratio of at least 3:1, optionally at least 5:1 and an smallest dimension of less than 15 microns, optionally less than 3 microns, or reducing a particulate starting material comprising silica-containing particles comprising a plurality of elongate structural elements, each elongate structural element having an aspect ratio of at least 3:1, optionally at least 5:1 and an smallest dimension of less than 15 microns, optionally less than 3 microns.

In an ninth aspect the invention provides a method of forming a particulate material comprising silicon, the method comprising the step of reducing a particulate starting material comprising silica-containing particles wherein the particulate starting material is no more than 95% silica by weight.

Optionally according to the ninth aspect, the particulate starting material is no more than 90% silica by weight.

In an tenth aspect the invention provides a method of forming a particulate material comprising silicon, the method comprising the step of reducing a particulate starting material comprising silica-containing particles wherein the particulate material comprising silicon has a specific surface area per unit weight of less than 100 m2/g.

Optionally according to the tenth aspect, the particulate material comprising silicon has a specific surface area per unit weight of less than 50 m2/g.

In an eleventh aspect the invention provides a method of forming a particulate material comprising silicon, the method comprising the step of reducing a particulate starting material comprising silica-containing particles wherein the particulate starting material is in contact with a layer of a thermal moderator.

In a twelfth aspect the invention provides a method of forming a particulate material comprising silicon, the method comprising the step of partially reducing silica of a particulate starting material comprising silica-containing particles, and treating the partially reduced silica to remove remaining starting material.

Optionally according to the twelfth aspect, the remaining starting material is removed using HF.

Optionally according to the twelfth aspect, the remaining starting material is removed to form a hollow core in the particulate material comprising silicon.

Optionally according to the twelfth aspect, the particulate material comprising silicon is a flake having a hollow core or a tube.

It will be understood that optional features and steps of the method of the first aspect may be applied to the method of any one of the seventh, eighth, ninth, tenth, eleventh or twelfth aspects including, without limitation, treatment of a silica-containing material to form the starting material; treatment of a silicon-containing product following reduction; optional features of the reduction process; composition of the starting material and of the silicon-containing product; and dimensions of the starting material and of the silicon-containing product. The silicon-containing product obtainable by any one of the seventh, eighth, ninth, tenth, eleventh or twelfth aspects aspects may be used in place of the product obtainable by the first aspect in electrodes, in slurries and in metal ion batteries as described in the third, fourth, fifth and sixth aspects.

DETAILED DESCRIPTION OF THE INVENTION

Figure 1:
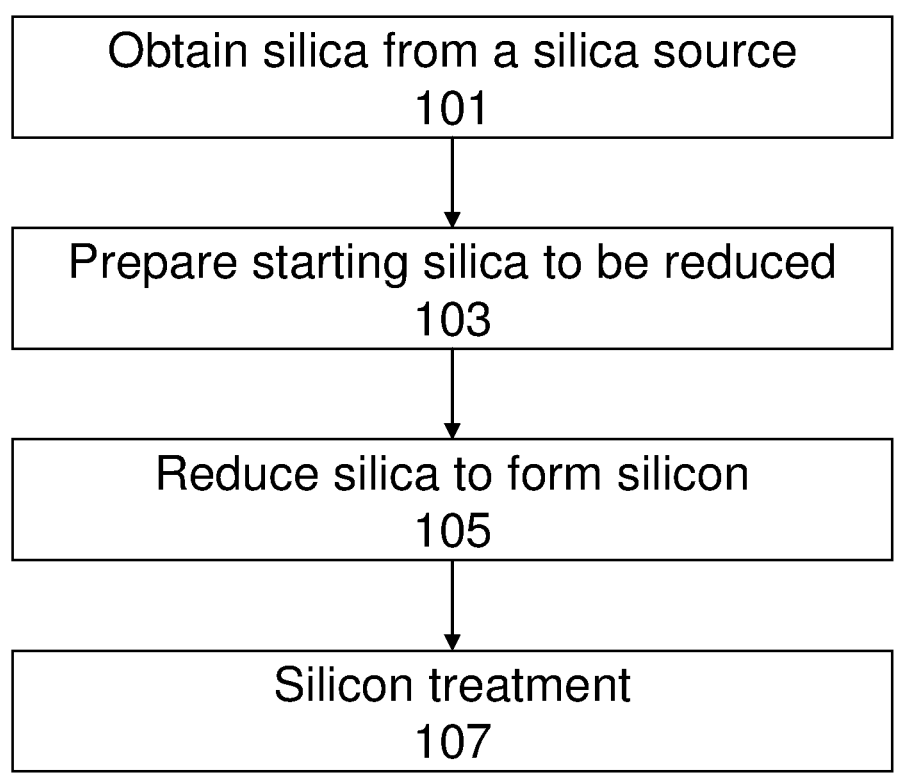
FIG. 1 is a flowchart illustrating a process according to an embodiment of the invention.

FIG. 1 is a flowchart illustrating a process according to an embodiment of the invention.

In a first stage 101, silica is obtained from a silica source. In one arrangement, the obtained silica may be modified at step 103, for example modified to change its shape to provide a structured starting material such as elongate particles of a starting material containing silica, or a structure comprising a plurality of such elongate particles, that is reduced to silicon to form a silicon-containing product in step 105 which is preferably then cleaned to remove by-products from the reduction reaction. Other modifications may be one or more of: changing morphology of the source material and including additives, such as dopants, in the source material. In another arrangement, the obtained silica may be used as the starting silica for silica reduction without any modification if it is in a suitable structured form.

The structured starting material may consist essentially of silica, or it may contain one or more further materials. Likewise, the silicon-containing product formed by reduction of the structured starting material may consist essentially of silicon or may contain one or more further materials. Optionally, the structured starting material may contain more than 50% silica by weight. Further materials may be provided at the surface of the structured starting material or may be substantially enclosed by a silica surface of the structured starting material.

The silicon-containing product obtained from step 105 may be used directly, preferably after removal of all or the majority of reaction by-products, for example as the active anode material of a metal ion battery, or it may optionally, be further treated in step 107 before being used. Example further treatments may include treatments to alter the composition and/or shape of the reduced material, such as doping, removal of remaining silica or other impurities, surface modification of the silicon with a coating, and structural modification such as metal-assisted etching to form elongate structures on the silicon surface.

The reduced material may be combined with one or more other electroactive or conductive materials to form a composite material containing the reduced material. Exemplary electroactive and conductive materials include electroactive and/or conductive carbon materials for example graphite, graphene, carbon black, carbon nanotubes and carbon-nano-fibres.

Figure 2A:
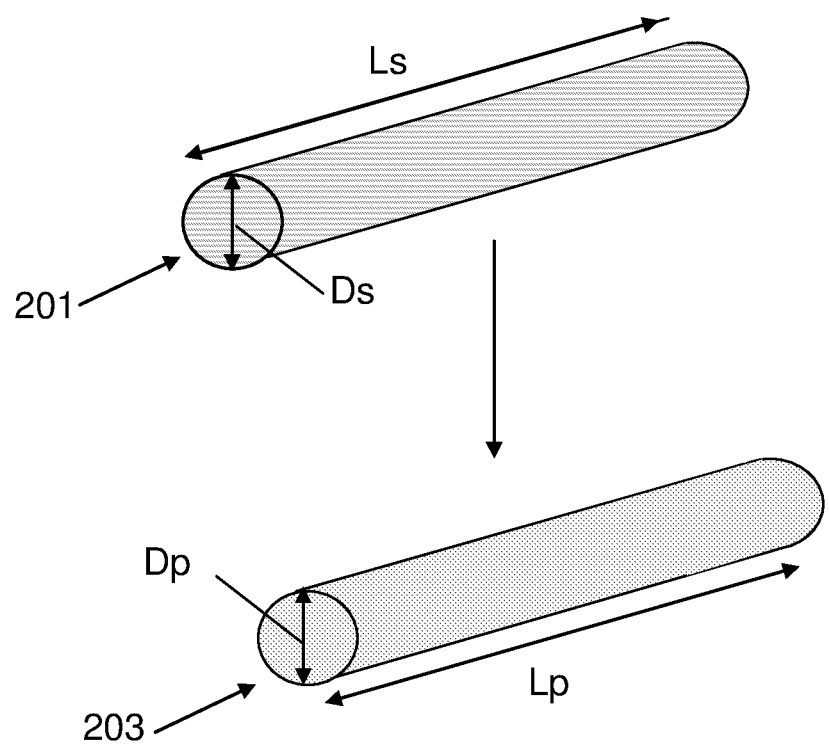
FIG. 2A illustrates a process according to an embodiment of the invention.

FIG. 2A illustrates a reduction process according to an embodiment of the invention. According to this process, a structured starting material containing silica 201 is reduced to form a structured silicon-containing product 203. Substantially all of the silica is reduced in this embodiment.

Figure 2B:
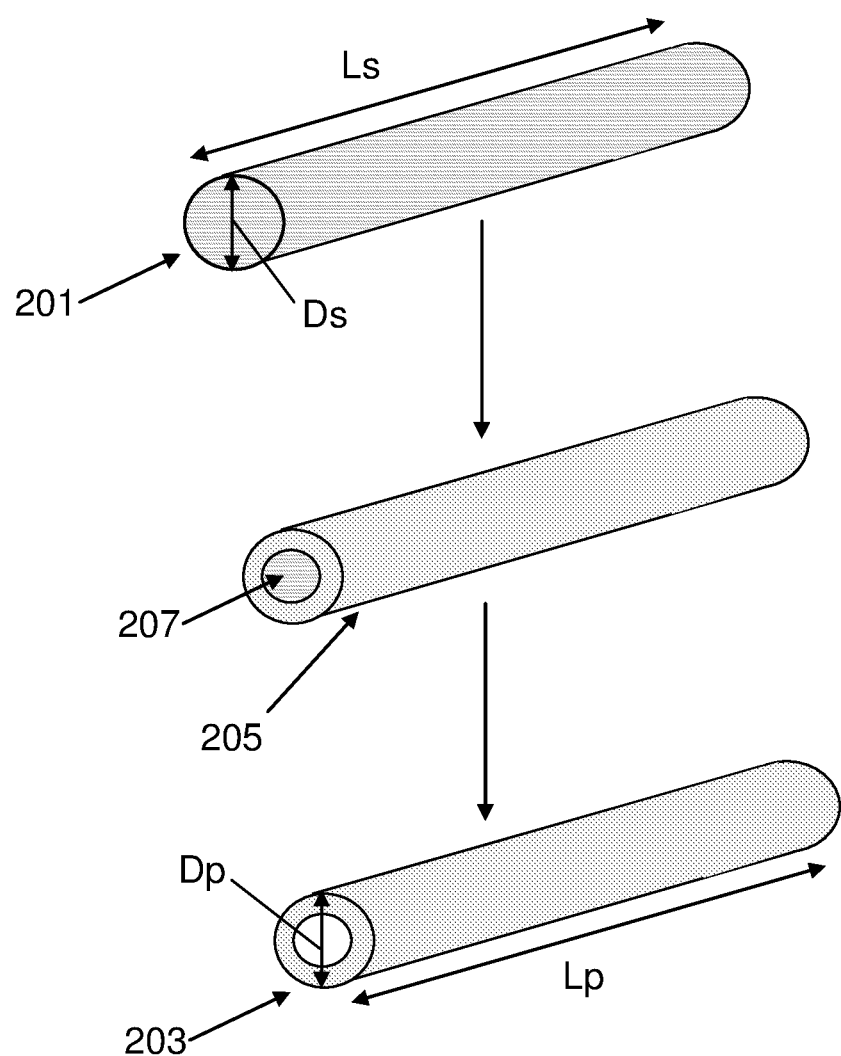
FIG. 2B illustrates a process according to another embodiment of the invention.

FIG. 2B illustrates a further process according to an embodiment of the invention. The surface of the starting silica 201 is reduced, however silica at a core 207 of the starting material is not reduced, to form an intermediate product 205. This intermediate product may undergo further treatment to form a final silicon-containing product 203 that is hollow along at least part of its length. This may be formed by selective removal of silica at the core 207 of the intermediate product to form at least partially hollow final silicon-containing product 203. Preferably, all silica is removed to form a silicon tube 203 that is hollow along its length. Suitable methods for selective removal of silica include etching with HF or treatment with aqueous metal hydroxide, for example sodium hydroxide. Use of a hydroxide may also remove irregularities on the silicon surface. Depending on the length of the starting material and the porosity of the silicon shell, the partially reduced silica may be broken into shorter lengths to allow greater access to the silica core. If the porosity of the silicon shell is high enough, the silica etchant (such as HF) can access all of the silica core without the need to break the reduced material into shorter lengths. The specific surface area (e.g. BET value) of the silicon product may increase during removal of the silica core. In other embodiments, the product 205 is not an intermediate product but is used without removal of silica, for example as an active anode material of a metal ion battery.

The reduction step of this process may be up to a depth of 1000 nm, 2000 nm, 3000 nm, 5000 nm or 8000 nm from the surface of the starting material. The reaction parameters such as heating profile and ratio of components of the reaction mixture may be selected to control the depth of reduction.

In both embodiments of FIG. 2A and FIG. 2B, the external shape of the structured silicon-containing product 203 is the same as that of the structured starting silica material 201. In other embodiments, individual particles of the product and starting material may have the same shape, but discrete particles of the starting material may become fused to each other at one or more points in the final product whilst still maintaining their individual shapes and forms. For example, discrete elongate particles of a starting material, such as fibres, may form a porous felt or mat following reduction consisting of a plurality of elongate particles with essentially the same shape and size as the starting material particles but arranged in a random or non-random manner to form an interconnected network where each elongate particle has become fused to one or more other particles at one or more points. Such a felt or mat may be broken to form a product powder prior to use.

In the embodiment of FIG. 2A, the geometric surface area of the geometric shape of the silicon-containing product is substantially the same as the geometric surface area of geometric shape of the starting material because the geometric shapes of the starting material and the product are substantially unchanged. In the embodiment of FIG. 2B, the removal of the silica core from intermediate product 205 results in a change in the geometric shape of the silicon-containing product as compared to the starting silica, and a change in the geometric surface area of the product. ("geometric surface area" as used herein is a bulk surface area of the starting material or product due to the geometric shape of the starting material or product and assumes a smooth surface of the starting material or product, in contrast to a specific surface area taking into account the effect on surface area of pores or voids, for example as given by a BET measurement).

The structured starting material 201 illustrated in FIGS. 2A and 2B is a cylinder, which is reduced to form a silicon cylinder in the case of FIG. 2A and an at least partially hollow silicon cylinder, optionally a tube, in the case of FIG. 2B. However, it will be appreciated that the starting material may take other shapes, for example a flake.

The structured starting material, and final structured silicon-containing product, may be in the form of elongate particles having a high aspect ratio, for example an aspect ratio of at least 3:1 or at least 5:1, and a smallest dimension of less than 15 microns, less than 10 microns, less than 3 microns, less than 2 microns or less than 1 micron.

The structured starting material may comprise a plurality of structural elements, each structural element having a high aspect ratio, for example an aspect ratio of at least 3:1 or at least 5:1, and a smallest dimension of less than 15 microns, less than 10 microns, 3 microns, less than 2 microns or less than 1 micron.

Aspect ratios as described herein are a ratio of length to smallest external dimension (for example the smallest thickness) of the starting material. In the case of the cylindrical starting materials of FIGS. 2A and 2B the aspect ratio is the length $L_s$ to diameter $D_s$ of the starting material. In the embodiments of FIGS. 2A and 2B, the aspect ratio of the starting material is substantially the same as the aspect ratio of the product (ratio of product length $L_p$ to diameter $D_p$). It will be understood that, in the case of the hollow product of FIG. 2B, the aspect ratio of the product is the ratio of length $L_p$ to diameter $D_p$; it is not the ratio of length $L_p$ to thickness of the tube wall of the product.

The smallest dimension as described herein may be an external thickness of the product, for example the diameter of the starting materials or products of FIGS. 2A or 2B, or it may be a wall thickness in the case of a hollow material. For example, the smallest dimension of the product 203 of FIG. 2B is the wall thickness of the product rather than the smallest external dimension, which is diameter $D_p$.

In a preferred embodiment, the starting material does not comprise a substantially enclosed void volume and the smallest dimension of the starting material is an external thickness of the starting material.

When the silicon-containing product is used as an active component of a metal ion battery anode, such as a lithium ion battery, reduction of the starting material to a depth of up to 15 microns, up to 10 microns, up to 3 microns, up to 2 microns or up to 1 micron allows for efficient insertion of metal ions into the silicon.

Optionally, at least 10% of the particles of the starting material or at least 10% of the particles of the silicon-containing product have an aspect ratio and a smallest dimension as described above. Optionally, at least 20%, 30%, 40% or at least 50% of the particles have these dimensions.

Dimensions of particulate starting material or particulate silicon-containing product material may be measured by scanning electron microscopy or TEM. An image of a sample of the particulate material may be divided into a plurality of grid areas, and measurements may be made in randomly selected grid areas in order to determine the percentage of particles of the grid area, and therefore of the larger sample, that possess the dimensions described above. This measurement process may be carried out on one, two or more samples of a particulate material to determine the aforementioned percentage.

Figure 3:
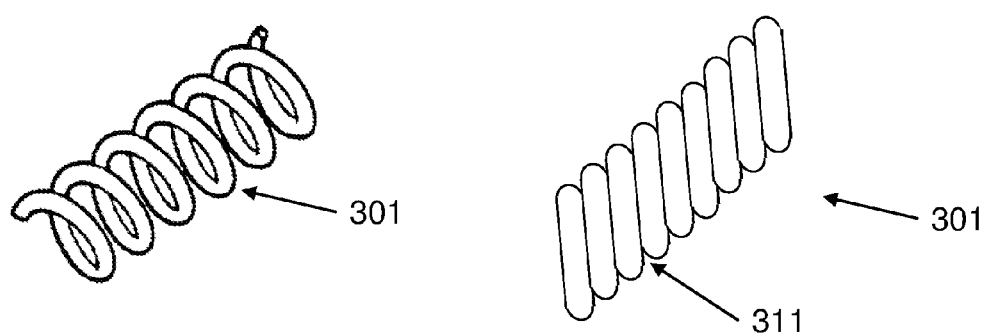
FIG. 3 illustrates spring-like and helically grooved starting materials according to embodiments of the invention.

Starting materials and products having a high aspect ratio include flakes, and elongate structures such as wires, fibres, rods, tubes and helices. FIG. 3 illustrates a spring-like elongate starting material 301 and an elongate starting material 301 in the form of a rod having helical grooves 311. The elongate structures may also comprise wires or rods with one or more grooves or indentations in the outer surface running along the length of the wire/rod and parallel to the wire/rod axis.

Starting materials and products having a plurality of high aspect ratio structural elements as described above include open frameworks such as cages and mats. These starting materials and products may consist solely of high aspect ratio elements or may include one or more further elements, for example non-high aspect ratio structural elements.

Figure 4:
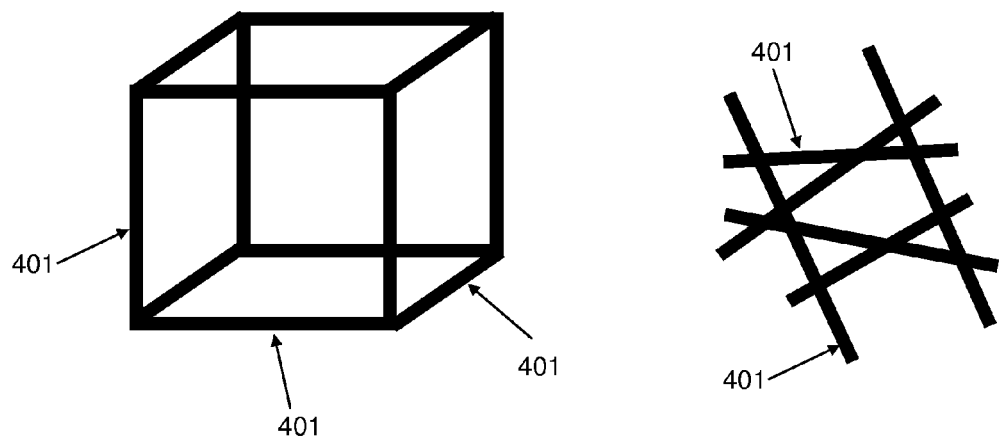
FIG. 4 illustrates exemplary starting materials formed from a plurality of elongate silica-containing elements according to embodiments of the invention.

FIG. 4 illustrates exemplary starting silica open framework structures comprising a plurality of high aspect ratio structural elements 401. In another embodiment, the starting material may be a particle having a plurality of flake-like structural elements clustered together, where the structural elements have an aspect ratio of at least 3:1 or at least 5:1 and preferably a smallest dimension of less than 3 microns, more preferably less than 1 micron.

Figure 5:
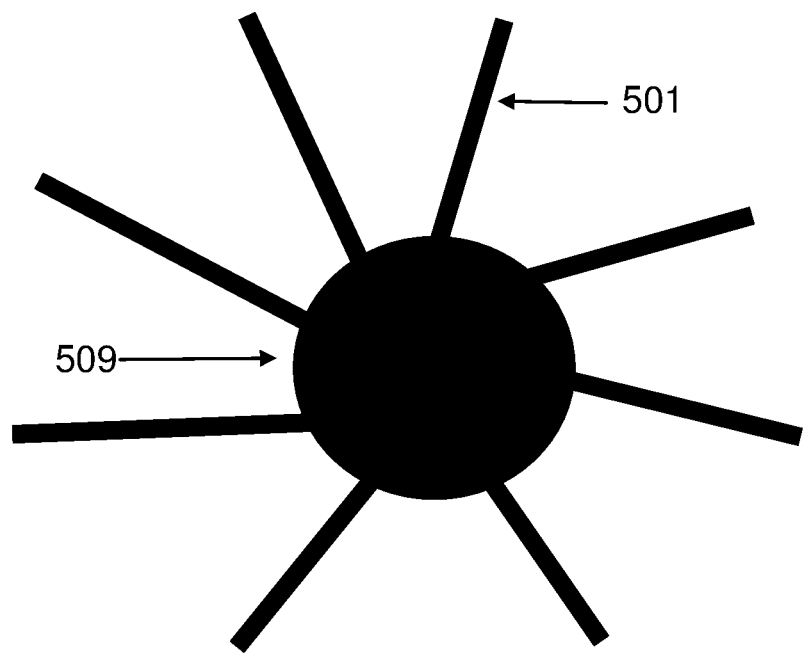
FIG. 5 illustrates an exemplary starting material having a core and elongate silica-containing elements extending therefrom according to an embodiment of the invention.

The starting material may comprise structural elements that do not have a high aspect ratio and/or smallest dimension as described above in addition to elements that do have the aforementioned high aspect ratio and smallest dimension. FIG. 5 illustrates an exemplary structured silica particle comprising a silica core 509 that does not have a high aspect ratio, and high aspect ratio silica elements 501 extending from the core.

Silica Sources

The starting silica may be synthetically derived or may be biogenic silica. Example sources for biogenic silica include specific species of land based plants, marine and freshwater sponges, diatoms or mollusc which extract silicic acid from the soil or seawater, forming intricate silica structures which may be in the form of an open network of fibrils, elongate elements extending outwards form a central core or other structured forms containing elongate elements. Examples of such species include marine sponges, for example euplectella aspergillum; canary grass; the silica cage of the Venus flower plant; and filamentous thermophile bacteria. Preferably the biogenic silica is derived from land based plants which may offer the most sustainable method of silica fibre production.

Silica fibres can also be synthesized from plant based sources containing high amounts of silica not in a structured form. For example, the production of silica nanowires prepared from rice ash husk is described by Pukird et al. in J. Metals, Materials and Minerals, Vol. 19, pp 33-37, 2009. Silica nanowires with diameters of 40-200 nm and lengths of a few microns were synthesized by thermal evaporation of rice husk ash and coconut shell at 1350 deg C in a nitrogen atmosphere.

An exemplary method for synthesising silica is by a sol-gel process.

Structured Silica Formation

Preferably, the starting material to be reduced is structured to have the same shape desired for the silicon-containing product.

The starting silica may be in the form of a powder of elongate particles having a high aspect ratio or particles comprising a plurality of elongate elements having a high aspect ratio.

One method of forming a structured starting material is electrospinning. Electrospinning is described in, for example, Choi et al, J. Mater. Sci. Letters 22, 2003, 891-893, "Silica nanofibres from electrospinning/sol-gel process" and Krissanasaeranee et al, "Preparation of Ultra-Fine Silica Fibers Using Electrospun Poly(Vinyl Alcohol)/Silatrane Composite Fibers as Precursor" J. Am. Ceram. Soc., 91 [9] 2830-2835 (2008), the contents of which are incorporated herein by reference.

Ma et al, Colloids and Surfaces A: Physicochem. Eng. Aspects 387 (2011) 57-64, "Silver nanoparticles decorated, flexible $SiO_2$ nanofibers with long-term antibacterial effect as reusable wound cover", the contents of which are incorporated herein by reference, discloses a method of forming flexible $SiO_2$ nanofibres without a polymer using $SiO_2$ fabricated by a sol-gel process.

In the electrospinning process, elongate fibres of a material may be drawn from a liquid containing that material. The liquid may be a solution or suspension of silica in one or more solvents, a sol-gel or a melt.

Electrospinning apparatus includes a power supply connected to a dispenser containing the liquid and to a grounded collector. The dispenser may be a syringe.

In operation, electrostatic repulsion causes ejection of a stream of the liquid towards the collector. The stream dries or solidifies to form electrospun silica. Electrospinning may be used to produce elongate fibres having a micro- or nano-scale diameter.

The properties of the structured silica formed by electrospinning, such as morphology and thickness, may be controlled by the parameters of the electrospinning apparatus and process such as the applied voltage and the distance from the dispenser to the collector. The collector may be shaped to provide a template for moulding the liquid arriving at the collector. For example, the collector may be provided with grooves or other patterning for forming a desired texture at the silica surface.

The electrospun material may consist of silica, or may contain one or more other materials, for example carbon. The electrospun material may include dopants suitable for n- or p-doping of silicon formed by reduction of the silica. Another method of forming structured silica is vapour-liquid-solid (VLS) growth of silica.

A yet further method of forming structured silica is vapour-induced solid-liquid-solid growth in which elongate amorphous silica wires are grown from a silicon powder in the presence of oxygen, for example using the method described in Zhang et al, "Vapor-induced solid-liquid-solid process for silicon-based nanowire growth", Journal of Power Sources 195 (2010) 1691-1697, the contents of which are incorporated herein by reference.

A yet further method of forming elongate starting material is to draw silica melt through a die. The die may be arranged vertically, and silica melt provided at the top of the die may be drawn through the die under gravity. Other methods for forming silica in a desired shape are sol-gel assembly, templated deposition, microfiber drawing, and chemical vapour deposition (CVD). Elongate silica wires may be twisted or helical, such as the Silica Nanosprings™ made by GoNano Technologies Inc. using a CVD process in tubular flow furnace and having diameters of around 85-200 nm. Silica fibres may be provided as an interconnected porous mat or felt, vertically arranged on substrate or as a plurality of discrete elongate elements.

A non-particulate material containing silica may be pulverised by any known process, for example milling, to form a particulate starting material. For example a silica-based film or membrane formed from a melt or by known deposition methods can be milled to form silica-based flakes.

The aforementioned methods allow formation of structured silica having a shape desired for silicon. By reduction of the starting material using a method that preserves the shape of the silica, the desired structured silicon shape can be obtained with little or no wastage of the starting material.

The silica of the starting material may be crystalline, polycrystalline, microcrystalline, nanocrystalline or amorphous. Preferably the starting silica is microcrystalline, nanocrystalline, or amorphous since it is more biocompatible than crystalline or polycrystalline silica and therefore safer to handle. In this respect microcrystalline or nanocrystalline silica means that the silica is comprised from crystalline grains of less than 100 nm, which may be present within an amorphous phase. Polycrystalline shall be taken as meaning that the silica comprises crystalline silica grains of more than 100 nm, for example more than 500 nm, or more than 1 µm. The morphology of the silica source material may be modified to provide a desired morphology of the starting material. The silicon product may be crystalline, polycrystalline, nanocrystalline, microcrystalline or amorphous. Any one of crystalline, polycrystalline, nanocrystalline, microcrystalline and amorphous silica starting material may produce any one of crystalline, polycrystalline, nanocrystalline, microcrystalline and amorphous silicon product. The terms nanocrystalline, microcrystalline and polycrystalline applied to silicon shall take a similar meaning as for silica, i.e. polycrystalline shall mean grain sizes for more than 100 nm and nanocrystalline or microcrystalline shall refer to grain sizes less than 100 nm.

The starting silica may be porous, optionally mesoporous (pore sizes less than 50 nm) or macroporous (pore sizes more than 50 nm), or substantially non-porous.

The starting material may consist essentially of silica, or may contain one or more further materials, and the one or more further materials may remain in the end product. For example, the starting material may contain carbon, or it may contain metal ions such as alkali ions, for example lithium ions such as lithium oxide or sodium ions such as sodium oxide, or it may contain other metal oxides. The presence of these further materials may be advantageous in use of the reduced product. For example, the presence of lithium ions may improve performance of a metal ion battery containing silicon produced by reduction of silica containing lithium ions.

Reduction of impure silica may be a low cost method of producing silicon suitable for use in metal ion batteries. Optionally, silica starting material is no more than 95% pure by weight, optionally no more than 90 weight % or 80 weight % pure. Optionally, silica starting material has a purity of at least 55 weight %, optionally at least 60 weight %.

The further material or materials may be mixed with the starting material prior to reduction, or may be impurities in the starting silica. Impurities may be naturally occurring or may be present as a result of a process used to form the starting silica.

Impurities present in the silica starting material may include one or more of the following:
(1) Carbon, for example up to 10 wt %, including carbon in the form of silicon carbide;
(2) one or metals or metal oxides, for example selected from Li, Na, Mg, Zn, Al, Ti, Ca, B or oxides thereof, where each metal oxide is present in amount no more than 20 wt %, or no more than 10 wt % or no more than 5 wt % and the total amount of all metal oxides is no more than 45 wt %.

The starting material may contain dopants capable of n- or p-doping the silicon-containing product formed by reduction of the starting material. For example, phosphorus-doped silica such as phosphosilicate glass may be used to form the starting particulate silica. More than 50%, more than 80%, more than 90%, more than 95% or more than 99% of the starting material may be silica by weight.

The silicon product may contain impurities from the reaction process, for example magnesium or calcium or impurities remaining from the starting material, as described herein. These impurities may or may not be removed prior to use of the product. The staring material and reaction products may be selected such that some or a substantial amount of the impurities can be left in the final silicon product without significantly affecting the performance of the product in use, for example as the active material in an electrode of a metal-ion cell. This allows the production cost to be minimised. However, if the amount of silicon in the final product is too low then its performance capacity as an active material in an electrode may be reduced. Preferably the silicon product comprises at least 30% silicon by weight, or at least 50% by weight, and optionally at least 75% by weight. The silicon product may comprise at least 95 wt % silicon. The preferred impurity content of the starting material may depend on the identity of the impurity, the difficulty of removing the impurity prior to reduction, and the positive or negative effect, if any, that the impurity has on efficacy of the silicon-containing product in its end use.

The inventors have discovered that the cost of producing silica starting material in the form of structured high aspect ratio particles described herein and reducing to silicon particles of substantially the same shape and size will typically will typically be much less than the cost of directly producing such silicon particles. Furthermore, other methods to produce the high aspect ratio silicon structures, such as the growth of silicon nanowires using CVD or solid-liquid-solid growth techniques is very difficult to scale up to the production of tonnes of material required that is required. The silica reduction method described herein provides a scalable, cost effective solution for producing the high aspect ratio silicon particles with a smallest dimension less than 15 micron, or less than 10, 3 or 1 micron that is described herein, for use as the active material in electrochemical cells such as lithium ion rechargeable cells.

Silicon Oxide Reduction

An exemplary method for reduction of silica to silicon is reduction by a metal, for example magnesiothermic reduction as shown in Equation (1):

$$Mg + SiO_2 \rightarrow 2MgO + Si \qquad \text{Equation 1}$$

Magnesium used in magnesiothermic reduction may be in its liquid or vapour state, and the reaction temperature may be selected accordingly. The reaction temperature is preferably maintained below the melting point of silica in order to avoid substantial changes in the silica structure caused by melting. The term reaction temperature as used herein means the temperature of the reaction chamber as set and controlled by the furnace or other heating device. Since the reduction process is an exothermic process then the local temperature experienced by the reactants during the reaction may be higher than the set reaction temperature. Preferably the reaction temperature is no more than 50° C. below the melting temperature of the silica starting material, especially no more than 100° C. below the melting temperature. Optionally, the reaction takes place at a reaction temperature of up to about 750° C., optionally up to 725° C. Preferably, the reaction takes place at a chosen reaction temperature in the range of 450° C.-750° C. or 450° C.-650° C. The reaction time at this reaction temperature may be in the range of 10-150 minutes. The starting material and reactants may be heated up to the reaction temperature over a period of one or more hours and may be cooled from the reaction temperature after the reaction has completed over a period of one or more hours.

Magnesiothermic reduction is strongly exothermic. A thermal moderator, for example a salt such as sodium chloride, may be provided in the reaction mixture in order to maintain the local temperature of the reaction mixture at or below a preferred maximum temperature, for example as described in US 2009/010833, the contents of which are incorporated herein by reference. As previously described the local temperature experienced by the reaction mixture during the reaction may be higher than the set reaction temperature of the furnace. The amount of silica may also be maintained at or below a limit to limit the maximum temperature.

A thermal moderator may be provided in contact with the reaction mixture in addition to, or as an alternative to, inclusion of a thermal moderator mixed into the reaction mixture. A layer of thermal moderator may be provided over the reaction mixture. The reaction mixture may be provided on a layer of thermal moderator, for example a layer of thermal moderator coating the interior of a reaction vessel. A thermal moderator may surround the reaction mixture.

The reaction temperature and the ratio of the reactants may be controlled to ensure that the silica material is reduced to silicon to the required amount and also to avoid alternate chemical reactions becoming more thermodynamically favourable, for example, for silica to be reformed from the reacted materials.

The magnesiothermic reduction is preferably carried out in an inert or reducing atmosphere, that is an atmosphere where oxidation is prevented. Magnesiothermic reduction may be carried out as described in, for example, U.S. Pat. No. 7,615,206, the contents of which are incorporated herein by reference.

Following reduction, the reaction mixture may be treated, for example with water and/or an acid such as hydrochloric acid, to remove magnesium oxide and, if present, the thermal moderator.

Calcium may be used in place of magnesium in the reduction.

The silica may be exposed to a doping agent during the reduction process in order to form doped silicon. For example, the silica may be exposed to boric acid during reduction to form p-doped silicon. Doping during the reduction process may be particularly preferred if the starting silica does not contain a material for doping of silicon produced by reduction of the starting silica. Dopants may include Al, B, P, Ga, As, Sb, Cu, Au, Ni and Ag.

Undoped silica may be doped during the reduction process, for example as described above with respect to boric acid, or may be doped in a step subsequent to the reduction process. The degree of doping of a doped starting material may be increased during the reduction process or in a step subsequent to the reduction process.

The efficacy of the reduction process may depend in part on the ability of the reducing agent to penetrate the surface of the starting silica, and therefore on the porosity of the starting silica. Substantially non-porous silica may take longer to reduce to the same degree as porous silica.

If some but not all of the starting silica material is to be reduced, for example as illustrated in FIG. 2B, then the extent of reduction may be controlled by one or more of reaction time, reaction temperature, starting material thickness, starting silica material porosity, amount of any thermal moderator and the amount of the reducing metal.

The silicon produced may have substantially the same porosity as the starting silica, or a different porosity. The reduction process may result in higher porosity of the silicon-containing product as compared to the starting material.

The silica starting material and silicon product may both have an aspect ratio in the range of at least 3:1 or at least 5:1, and/or a smallest dimension of less than 15 microns or less than 10 microns.

The silica starting material and silicon product may both have structural elements having an aspect ratio in the range of at least 3:1 or at least 5:1.

The reaction parameters may be selected in order to control the BET (Brunauer Emmett Teller) value of the silicon product which measures the specific surface area of the material. For example, for use in a metal ion battery the reaction parameters may be selected to provide a silicon product may have a BET value of less than 100 $m^2/g$, optionally less than 50 $m^2/g$ and optionally less than 20 $m^2/g$. The BET value of the product may be the same as, lower than or higher than that of the starting material. Parameters that may affect the BET value of the product include:

Dimensions and surface area of the silica-containing starting material.

Crystallinity of the starting material. In a preferred embodiment, the starting material is amorphous both for producing the desired silica-containing product and for safety reasons as handling particulate crystalline silica generally carries greater health and safety risks.

Identity and level of impurities in the silica starting material, which for example may affect the softening and melting temperatures of the silica.

Heat treatment profile during reduction. For example the reactants may be heated to a reaction temperature of 650-725° C. at a heating rate of 5-15° C. per minute, held at the reaction temperature for 30-150 minutes and cooled down to room temperature at a rate of 5-15° C. per minute Ratio of starting material to reducing metal. For example, the reducing metal:starting material molar ratio may be in the range 1.5:1 to 5:1.

Ratio of starting material to thermal moderator, if present. The molar ratio of starting material:thermal moderator in the reaction mixture may be 1:0 to 1:5, preferably the molar ratio is no more than 1:2 Where no thermal moderator is present in the reaction mixture it is preferable that the reaction mixture is at least in contact with a thermal moderator, for example the mixture is placed on a layer of thermal moderator or has capping layer.

The softening temperature of the silica-based starting material. For example the softening temperature may be between 650-725° C., for example equal to or less than the chosen reaction temperature. For example, it is believed by the inventors that having a softening temperature of the silica less than the reaction temperature, for example at least 5° C. less or at least 10° C. less than the reaction temperature, whilst the silica melting temperature is higher than the reaction temperature, may help to reduce the BET of the silicon product.

The amount of silica remaining in the silicon product.

The amount of remaining reactant products or starting material impurities that are not removed during the cleaning steps after heat treatment. For example, if excess reducing metal remains in the silicon product, this may reduce the BET value.

A molar ratio of a material as recited anywhere herein is calculated taking into account the purity of the material. For example, the number of moles of a mass M of silica material that is 70% pure by weight is calculated based on a silica mass of M×0.7.

Preferably the silicon product is microcrystalline or nanocrystalline, for reasons of handling (since fully amorphous silicon is highly reactive in air and easily oxidised which makes storage and handling more problematic) as well as controlling BET.

The conductivity of the silicon may be controlled by one or more of the extent of doping of the starting silica material and the use of a doping agent during the reduction process, such as boric acid as described above.

Treatment of Silicon

Depending on the application, silicon formed by reduction of silica may be used directly or may be treated prior to use.

One exemplary treatment is coating some or all of the surface of the silicon, for example with a carbon coating;

oxidising the surface of the silicon to form a silica surface; and functionalising the surface of the silicon, for example with oxygen- or nitrogen-containing groups such as COOH, OH, CO and $NH_2$ groups. This functionalised surface may improve adhesion of silicon to a surface or, where the silicon is used in a composition with other materials, improve connection to other components.

Another exemplary treatment is doping of the silicon, which may be doping of an undoped silicon-containing product or increased doping of an already-doped silicon-containing product.

The silicon product formed by reduction may be used as a precursor material, which may undergo further modification steps to make it more suitable for an application. This may include, for example, washing the silicon product in an acid or alkali solution to remove remaining silica or other impurities not remove by an earlier HCl or $H_2O$ cleaning step. This may make the silicon product particles hollow, for example as described with reference to FIG. 2B.

One optional treatment for silicon product produced by reducing silica flake-like particles is to etch the silicon particles using a wet chemical etching process such as metal-assisted etching to produce elongated structures or pillars on the surface of the silicon particles. This provides an alternate method to produce pillared particles with a high aspect ratio core, for example for use in metal ion electrochemical cells, as described in WO2012/175998.

Compositions

Silicon powder formed by the methods of the invention may be mixed with one or more further materials, such as one or more further powders and/or one or more polymeric binders, to form a composition. The silicon powder alone, or a composition containing the silicon powder, may be dispersed in one or more solvents to form a slurry.

Applications

Silicon formed by methods of the invention may be used in a range of applications including, without limitation, metal ion batteries, for example lithium ion batteries; electrochemical cells; lithium air batteries; flow cell batteries; other energy storage devices such as fuel cells and thermal batteries; photovoltaic devices such as solar cells; filters; sensors; electrical and thermal capacitors; microfluidic devices; gas/vapour sensors; thermal or dielectric insulating devices; devices for controlling or modifying the transmission, absorption or reflectance of light or other forms of electromagnetic radiation; chromatography; and wound dressings.

Silicon formed by methods of the invention offer benefits in application through having a higher surface area to volume ratio, providing buffer spaces for volume expansion of the material during use (i.e. so that structural integrity is maintained) and/or enabling good physical or electronic connectivity between a plurality of the particles within a porous coating or composite.

Figure 6:
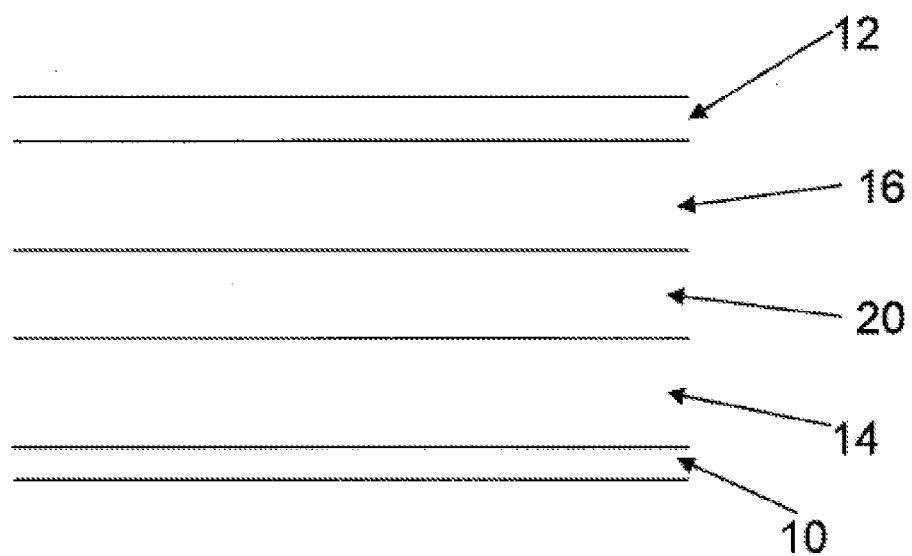
FIG. 6 illustrates a metal ion battery.

The structure of a rechargeable metal ion battery cell is shown in FIG. 6, which is not drawn to any scale. The battery cell includes a single cell but may also include more than one cell. The battery is preferably a lithium ion battery, but may be a battery of another metal ion, for example sodium ion and magnesium ion.

The battery cell comprises a current collector for the anode 10, for example copper, and a current collector for the cathode 12, for example aluminium, which are both externally connectable to a load or to a recharging source as appropriate. A composite anode layer containing active silicon particles 14 overlays the current collector 10 and a lithium containing metal oxide-based composite cathode layer 16 overlays the current collector 12 (for the avoidance of any doubt, the terms "anode" and "cathode" as used herein are used in the sense that the battery is placed across a load—in this sense the negative electrode is referred to as the anode and the positive electrode is referred to as the cathode. "Active material" or "electroactive material" as used herein means a material which is able to insert into its structure, and release therefrom, metal ions such as lithium, sodium, potassium, calcium or magnesium during the respective charging phase and discharging phase of a battery. Preferably the material is able to insert and release lithium.

In the case where the silicon-containing material formed by a method of the invention is in the form of a powder, a slurry comprising the powder and one or more solvents may be deposited over an anode current collector to form an anode layer. The slurry may further comprise a binder material, for example polyimide, polyacrylic acid (PAA) and alkali metal salts thereof, polyvinylalchol (PVA) and polyvinylidene fluoride (PVDF), sodium carboxymethylcellulose (Na-CMC) and optionally, non-active conductive additives, for example carbon black, carbon fibres, ketjen black or carbon nanotubes. In addition to providing the silicon powder to act as an active material in the battery, one or more further active materials may also be provided in the slurry. Exemplary further active materials include active forms of carbon such as graphite or graphene, Active graphite may provide for a larger number of charge/discharge cycles without significant loss of capacity than active silicon, whereas silicon may provide for a higher capacity than graphite. Accordingly, an electrode composition comprising a silicon-containing active material and a graphite active material may provide a lithium ion battery with the advantages of both high capacity and a large number of charge/discharge cycles. The slurry may be deposited on a current collector, which may be as described above. Further treatments may be done as required, for example to directly bond the silicon particles to each other and/or to the current collector. Binder material or other coatings may also be applied to the surface of the composite electrode layer after initial formation. Silicon formed by a method of the invention may make up 1-100 weight % of an anode composition.

Examples of suitable cathode materials include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.15}Al_{0.05}O_2$, $LiNi_{0.4}Co_{0.3}Mn_{0.3}O_2$ and $LiNi_{0.33}Co_{0.33}Mn_{0.34}O_2$. The cathode current collector is generally of a thickness of between 3 to 500 m. Examples of materials that can be used as the cathode current collector include aluminium, stainless steel, nickel, titanium and sintered carbon.

The electrolyte is suitably a non-aqueous electrolyte containing a lithium salt and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylenes carbonate, dimethyl carbonate, diethyl carbonate, gamma butyro lactone, 1,2-dimethoxy ethane, 2-methyl tetrahydrofuran, dimethylsulphoxide, 1,3-dioxolane, formamide, dimethylformamide, acetonitrile, nitromethane, methylformate, methyl acetate, phosphoric acid trimester, trimethoxy methane, sulpholane, methyl sulpholane and 1,3-dimethyl-2-imidazolidione.

Examples of organic solid electrolytes include polyethylene derivatives polyethyleneoxide derivatives, polypropylene oxide derivatives, phosphoric acid ester polymers, poly-ester sulphide, polyvinyl alcohols, polyvinylidine fluoride and polymers containing ionic dissociation groups.

Examples of inorganic solid electrolytes include nitrides, halides and sulphides of lithium salts such as $Li_5NI_2$, $Li_3N$, LiI, $LiSiO_4$, $Li_2SiS_3$, $Li_4SiO_4$, LiOH and $Li_3PO_4$.

The lithium salt is suitably soluble in the chosen solvent or mixture of solvents. Examples of suitable lithium salts include LiCl, LiBr, LiI, $LiClO_4$, $LiBF_4$, $LiBC_4O_8$, $LiPF_6$, $LiCF_3SO_3$, $LiAsF_6$, $LiSbF_6$, $LiAlCl_4$, $CH_3SO_3Li$ and $CF_3SO_3Li$.

Where the electrolyte is a non-aqueous organic solution, the battery is provided with a separator interposed between the anode and the cathode. The separator is typically formed of an insulating material having high ion permeability and high mechanical strength. The separator typically has a pore diameter of between 0.01 and 100 μm and a thickness of between 5 and 300 μm. Examples of suitable electrode separators include a micro-porous polyethylene film.

A liquid electrolyte may be provided between the anode and the cathode. In the example of FIG. 6, a porous plastic spacer or separator 20 is provided between the anode layer 14 and the lithium containing cathode layer 16, and a liquid electrolyte material is dispersed within the porous plastic spacer or separator 20, the composite anode layer 14 and the composite cathode layer 16. The porous plastic spacer or separator 20 may be replaced by a polymer electrolyte material and in such cases the polymer electrolyte material is present within both the composite anode layer 14 and the composite cathode layer 16. The polymer electrolyte material can be a solid polymer electrolyte or a gel-type polymer electrolyte.

When the battery cell is fully charged, lithium has been transported from the lithium containing metal oxide cathode layer 16 via the electrolyte into the anode layer 14.

EXAMPLES

Silica Starting Materials

Silica starting materials S1-1, S1-2, S2 and S3 as described in Table 1 below were reduced.

TABLE 1

| Ref. | Feedstock description | BET (m2/g) | Silica Purity (wt %) |
|---|---|---|---|
| S1-1 | Ultrafine quartz wool supplied by H. Baumbach & Co Ltd (UK). Nominal diameter of fibres = 2-10 μm | — | pure quartz |
| S1-2 | Needlemat (Isotherm S Silica Glass, 700 gsm, 6 mm thick), supplied by Sewglass Products Ltd, UK. Fibre diameter >5 μm | — | >94% |
| S2 | "Sunlovely" supplied by Asahi Chemical Glass, Japan. (particles comprising agglomerated silica flakes of thickness 100 nm), D50 = 4-6 μm | 65 | >98 wt % |
| S3 | Milled Glass Flake GF750M-C supplied by Glass Flake Ltd. (UK), Flake thickness = 3-10 μm | 0.24 | 64-70% |

Impurities in Material S3 are as follows:
$K_2O$=0-3 wt %;
$B_2O_3$=3-8 wt %;
ZnO=0-5 wt %;
$Na_2O$=11-18 wt %;
MgO=1-4 wt %;
CaO=3-7 wt %;
$Al_2O_3$=0-5 wt %;
$TiO_2$=0-3 wt %;
where the total amount of all impurities is 30-36 wt %.

The particles of material S3 are formed from an amorphous glass melt. The impurities affect the melting, flow and solidification properties of the material. S3 has a softening temperature of 688° C. and a melting temperature of 930-1020° C., although it will be appreciated that these values may be altered by different impurities and/or different impurity concentrations. The softening temperature which is also called the softening point is the temperature at which a fibre of the unsupported silica material will begin to sag. It may be determined using the standard test method defined by ASTM C338-93(2008).

S1-1 is a tangled, loose mass of crystalline silica fibres.
S1-2 is a flat fibrous mat made from silica glass fibres and formed into a sheet that can easily be cut, for example with scissors.

General Reduction Process

The materials of Table 1 were reduced according to the following general process:

1. The silica starting material was mixed with magnesium powder and optionally a powdered thermal moderator (e.g. salt, NaCl). The molar ratio of $Mg:SiO_2$ is preferably 1.5:1 to 2.5:1 for silica having a purity of at least 90% by weight, or 1.5:1 to 5:1 for silica having a purity of less than 90% by weight. The molar ratio of $SiO_2$:thermal moderator in the reaction mixture is preferably 1:0 to 1:1.5 for silica having a purity of at least 90% by weight, or 1:0 to 1:5 for silica having a purity of less than 90% by weight. Salt in the reaction mixture does not include salt forming a liner or capping layer as described below.

2. The reaction mixture was placed in a furnace, for example a quartz vessel. The vessel may be lined with a layer of the thermal moderator such that the reaction mixture is not in direct contact with the vessel base and/or side walls. A capping layer of thermal moderator may be deposited on top of the reaction mixture. All components are preferably dry.

3. The reaction mixture was heated to the reaction temperature slowly, for example over at least one hour, to remove any remaining water. The reaction mixture was held at the reaction temperature for about 30 mins to 2 hours and then allowed to cool down to room temperature.

Reactions were conducted using a belt furnace having an elongate reaction chamber with six adjacent heated zones, in between unheated start and end zones. The start/and end zones are not directly heated but are still within the furnace structure so will have a temperature gradient along them. The temperature of each zone is set by a thermocouple located in the middle of each zone. A moving belt made from an inconel mesh passes through the reaction chamber at a pre-determined speed. The reaction mixture is placed in shallow quartz trays (overall height of 11.5 mm) that are placed on the belt. The belt speed determines how long each tray spends within the heated zones.

The furnace has a reducing (oxygen-free) atmosphere of argon gas at a total flow rate of 100 l/min injected into both ends and the middle of the furnace. Exhaust and reaction gases are also extracted at three locations.

The reaction mixture was subjected to a heat treatment profile HT1 or HT2 as set out in Table 2.

TABLE 2

| Zone | Zone length (mm) | Temperature (° C.) for HT1 | Temperature (° C.) for HT2 |
|---|---|---|---|
| Start | 405 | >20 | >20 |
| Z1 | 356 | 350 | 350 |

TABLE 2-continued

| Zone | Zone length (mm) | Temperature (° C.) for HT1 | Temperature (° C.) for HT2 |
|---|---|---|---|
| Z2 | 355 | 470 | 490 |
| Z3 | 355 | 700 | 700 |
| Z4 | 356 | 700 | 703 |
| Z5 | 356 | 705 | 717 |
| Z6 | 355 | 500 | 704 |
| End | 1130 | >20 | >20 |
| Belt speed (mm/min) | — | 11.85 | 17.8 |
| Sample time at the reaction temperature (700° C.) (hours) | — | 1 | 1 |

Example 1-1

Reduction of Quartz Wool Fibres 2.5 g of quartz wool fibres (feedstock S1-1) were mixed with 2 g of Magnesium powder (99.8 wt % pure, 325 mesh, from Alfa Aesar) and 4.5 g NaCl (GPR Rectapur, >99% purity) to give a Mg:$SiO_2$:Salt ratio of 2:1:2.

50 g of salt was dispersed in a thin layer on the bed and sides of a quartz tray. The reaction mixture was dispersed on top of this layer and then covered with a 50 g layer of salt.

The tray was then placed in the belt furnace and subjected to heat treatment #1 (HT1) as set out in Table 2.

After heat treatment the reacted material was allowed to cool, then lightly broken up, rinsed in 1 liter of deionised water and dried through a large Buchner filter. 20 ml of 37% HCl was then added slowly over 2 hours until any visible reaction with the acid had ceased. Further HCl, up to 100 ml was then added. Finally the product was rinsed again in deionised water and dried overnight.

Example 1-2

Reduction of Needlemat Glass Fibres

A 7.7 g piece of the needlemat (feedstock S1-2) was cut using scissors to the size of the reaction tray and impregnated with 6.2 g of Magnesium powder (99.8 wt % pure, 325 mesh, from Alfa Aesar) and no salt to give a Mg:$SiO_2$:Salt ratio of 2:1:0.

40 g of salt was dispersed in a thin layer on the bed and sides of a quartz tray. The silica reaction mixture was dispersed on top and then covered with a 25 g layer of salt.

The tray was then placed in the belt furnace and subjected to heat treatment #2 (HT2) as set out in Table 2.

After heat treatment the reacted material was allowed to cool, then lightly broken up, rinsed in 1 liter of deionised water and dried through a large Buchner filter. 20 ml of 37% HCl was then added slowly over 2 hours until any visible reaction with the acid had ceased. Further HCl, up to 100 ml was then added. Finally the product was rinsed again in deionised water and dried overnight.

Example 2

Reduction of Silica Flake Agglomerates 14.4 g of silica flake agglomerates (feedstock S2) were mixed with 11.5 g of Magnesium powder and 26 g NaCl to give a Mg:$SiO_2$:Salt ratio of 2:1:2.

50 g of salt was dispersed in a thin layer on the bed and sides of a quartz tray. The silica reaction mixture was dispersed on top and then covered with a 37 g layer of salt.

The tray was then placed in the belt furnace and subjected to heat treatment #2 (HT2) as defined in the table above—i.e. a peak temperature of 700° C. for one hour but with a faster heating and cooling profile compared to HT1.

After heat treatment the reacted material was allowed to cool, then underwent post-reaction processing as described in Example 1-1.

Example 3-1

Reduction of Glass Flake 22.2 g of glass flake agglomerates (feedstock S3) were mixed with 17.8 g of Magnesium powder and no NaCl to give a Mg:Silica:Salt ratio of 3.1:1:0 (assuming a purity of 64% by weight for the glass flake).

38 g of salt was dispersed in a thin layer on the bed and sides of a quartz tray. The silica reaction mixture was dispersed on top and then covered with a 41 g layer of salt.

The tray was then placed in the belt furnace and subjected to heat treatment #2 (HT2) as set out in Table 2.

After heat treatment the reacted material was allowed to cool, rinsed in 1 liter of deionised water and dried through a large Buchner filter. Up to 100 ml of 37% HCl was then added over 15 minutes. Finally the product was rinsed again in deionised water and dried overnight.

Example 3-2

Reduction of Glass Flake

Glass flake silica was reduced as described for example 3-1 but more salt was used for the liner and capping layers (50 g and 62 g respectively) and heat treatment HT1 was used instead (a slower heating rate to the reaction temperature).

Example 3-3

Reduction of Glass Flake

Glass flake silica was reduced as described for example 3-2 except that salt was added to the reaction mixture to give a Mg:Silica:Salt ratio of 3:1:3, corresponding to 14.4 g of Glass Flake, 11.5 g Mg and 26 g NaCl (assuming a purity of 64% by weight for the glass flake).

Example 3-4

Reduction of Glass Flake

Glass flake silica was reduced as described for example 3-3 except that more Mg was added to the mixture giving a Mg:Silica:Salt ratio of 4:1:3, corresponding to 14.4 g of Glass Flake, 14.4 g Mg and 26 g NaCl (assuming a purity of 64% by weight for the glass flake).

HF Washing/Oxygen Analysis

To estimate the amount of silica remaining in the reacted and HCl cleaned product materials, the products were subjected either to a LECO oxygen analysis (Example 1 material) or treated with an HF wash (Example 2 and 3 materials). From the weight % $O_2$ value from the LECO analysis, the amount of remaining silica was estimated by assuming that all the oxygen was associated with silica and no other contaminants or remaining impurities—this calculation therefore provides an upper estimate of the amount of silica. For the HF wash to remove remaining silica, the samples were treated with a 200 ml solution of 40% HF solution per 0.5 g of reduced material, and allowed to rest for 10 minutes before rinsing through a Buchner filter and drying. The mass of the remaining HF washed material was measured and compared to the initial mass before washing. The resultant percentage mass loss provides an upper estimate for the approximate amount of silica remaining in the sample. A small amount of silicon will however be lost at the same time. To assess the potential mass loss due to silicon loss, a control sample comprising 99.999 wt % purity solid silicon microparticles was treated with the same HF wash, resulting in a 10% mass reduction.

Table 3 lists the BET data for the feedstock, reduced and HF washed materials.

Figure 9A:
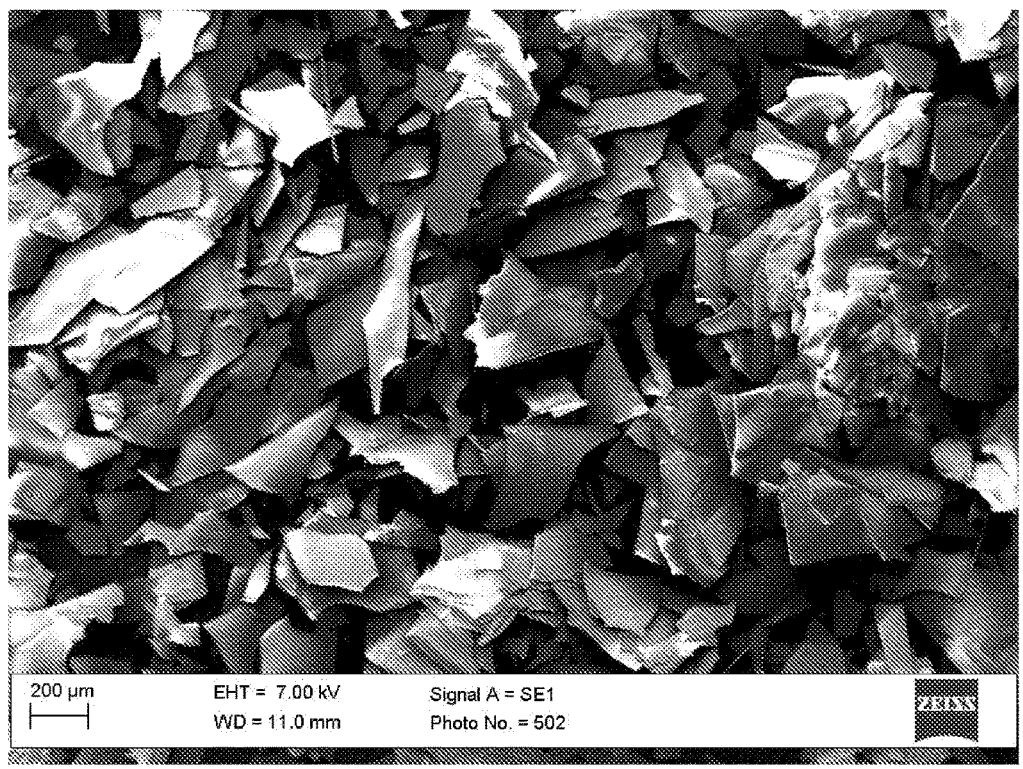
FIG. 9A is a SEM image of glass flake starting material S3.
Figure 9B:
FIG. 9B is a SEM image of glass flake starting material S3 following reduction and HCl treatment.

Example 3-1 (FIG. 9B shows the reduced flakes following HCl treatment). It can be seen that the shape of the flakes is retained following reduction.

Figure 9C:
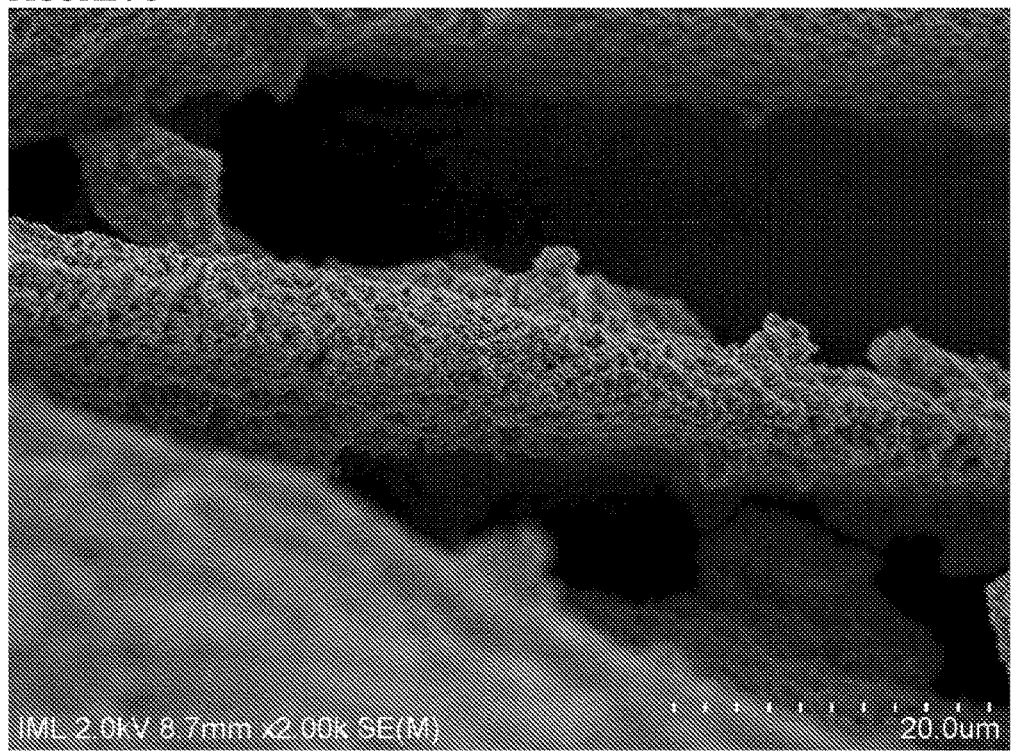
FIG. 9C is a SEM image of an individual flake of glass flake starting material S3 following reduction and HCl treatment.

FIG. 9C is a SEM image of an individual flake of glass flake starting material S3 from Example 3-1 following reduction and HCl treatment, showing the porous structure at the flake surface.

Figure 9D:
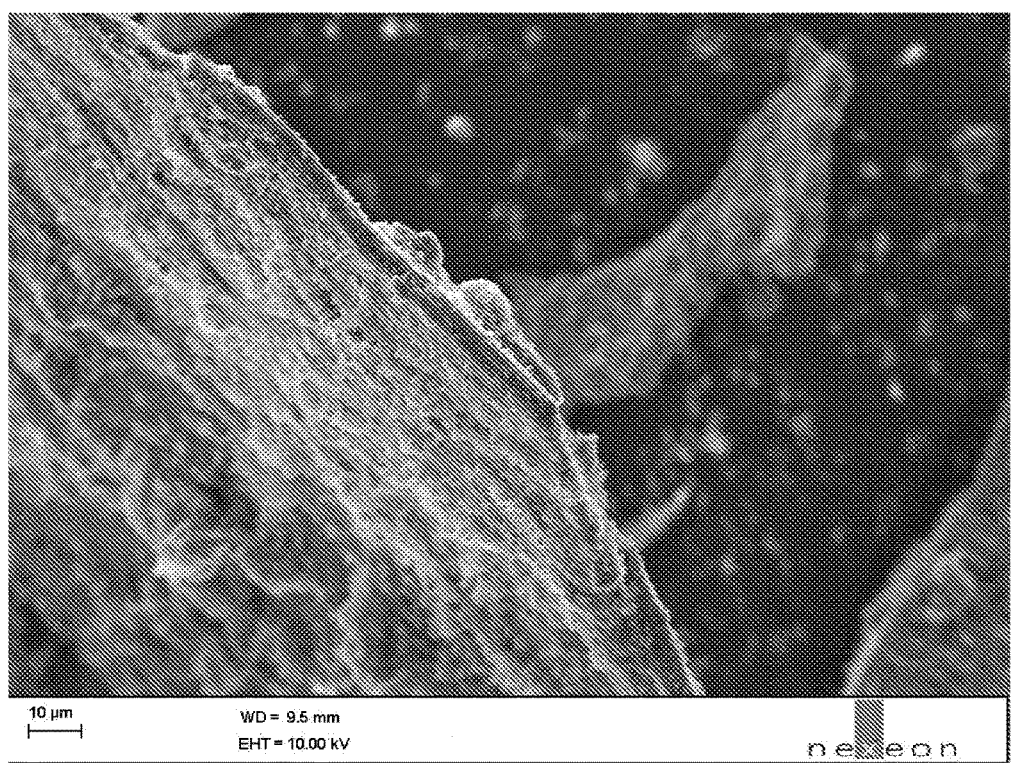
FIG. 9D is a SEM image of an individual flake of glass flake starting material S3 following reduction and HCl and HF treatment.

FIG. 9D is a SEM image of an individual flake of glass flake starting material S3 from Example 3-1 following reduction and HCl and HF treatment with a thickness of around 5 microns. The original silica flake morphology has been preserved through reduction, HCl treatment and HF removal of residual oxide phases.

TABLE 3

| Example | Feedstock BET ($m^2/g$) | Heat treatment | Mg:Silica:NaCl ratio in reduction mixture* | BET after reduction and HCl clean ($m^2/g$) | BET after HF wash ($m^2/g$) | Mass loss from HF wash (%) | Max. silica content from LECO $O_2$ analysis (wt %) |
|---|---|---|---|---|---|---|---|
| 1-1 | — | HT1 | 2:1:2 | 164.8 | — | — | 74% |
| 1-2 | — | HT2 | 2:1:0 | — | — | — | — |
| 2 | 65 | HT2 | 2:1:2 | — | 37.5 | 20% | — |
| 3-1 | 0.24 | HT2 | 3.1:1:0 | 29.2 | 42 | 17% | — |
| 3-2 | 0.24 | HT1 | 3.1:1:0 | 119.2 | — | 80% | 74% |
| 3-3 | 0.24 | HT1 | 3:1:3 | 264.8 | — | 78% | 47% |
| 3-4 | 0.24 | HT1 | 4:1:3 | — | — | 91% | — |

*In calculating these molar ratios the silica purity of the starting material was taken into account for low purity material S3, but not for materials S1-1, S1-2 and S2, which were assumed to be 100% pure (each have a purity of greater than at least 94% by weight)..

With reference to Table 3, it will be appreciated that factors that may be used to control the BET value of the silicon product include selection of the heat treatment conditions (as shown by comparison of 3-1 and 3-2) and the presence, absence or concentration of salt (as shown by comparison 3-2 and 3-3). Comparing examples 3-2 to 3-4 with example 3-1, it can be seen that reducing the amount of thermal moderator and increasing the amount of magnesium powder has led to less conversion of the silica to silicon and higher BET values in the final product.

Figure 7A:
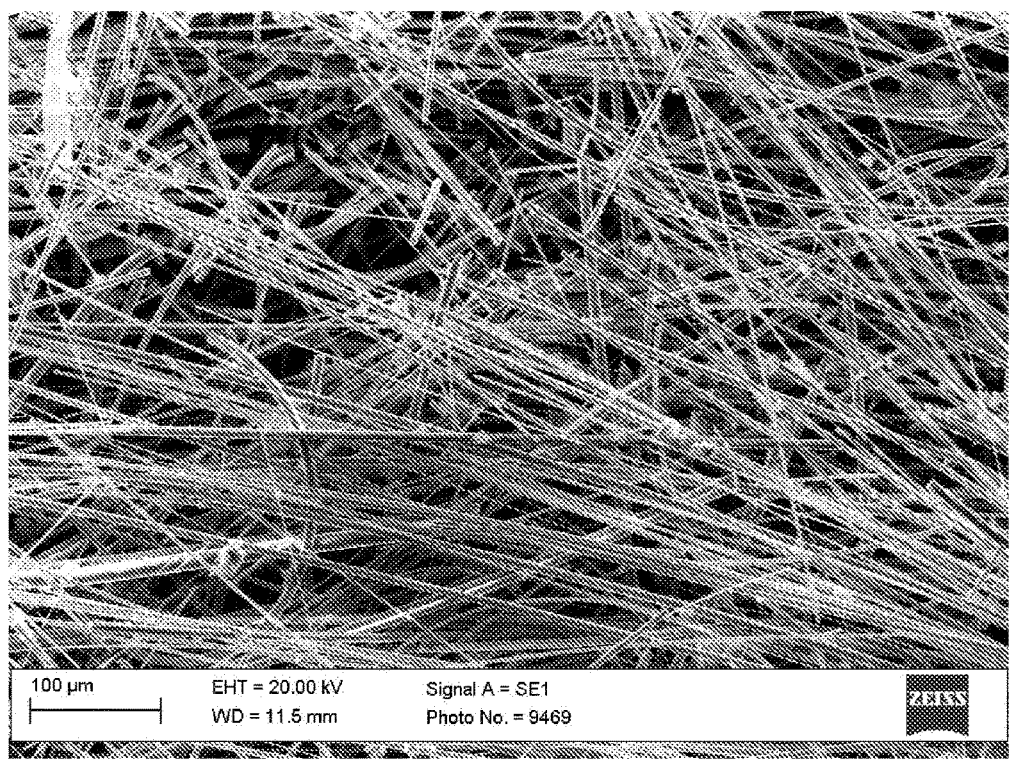
FIG. 7A is a SEM image of quartz wool starting material S1-1.

FIG. 7A is a SEM images of quartz wool starting material S1-1 showing fibres of the starting material.

Figure 7B:
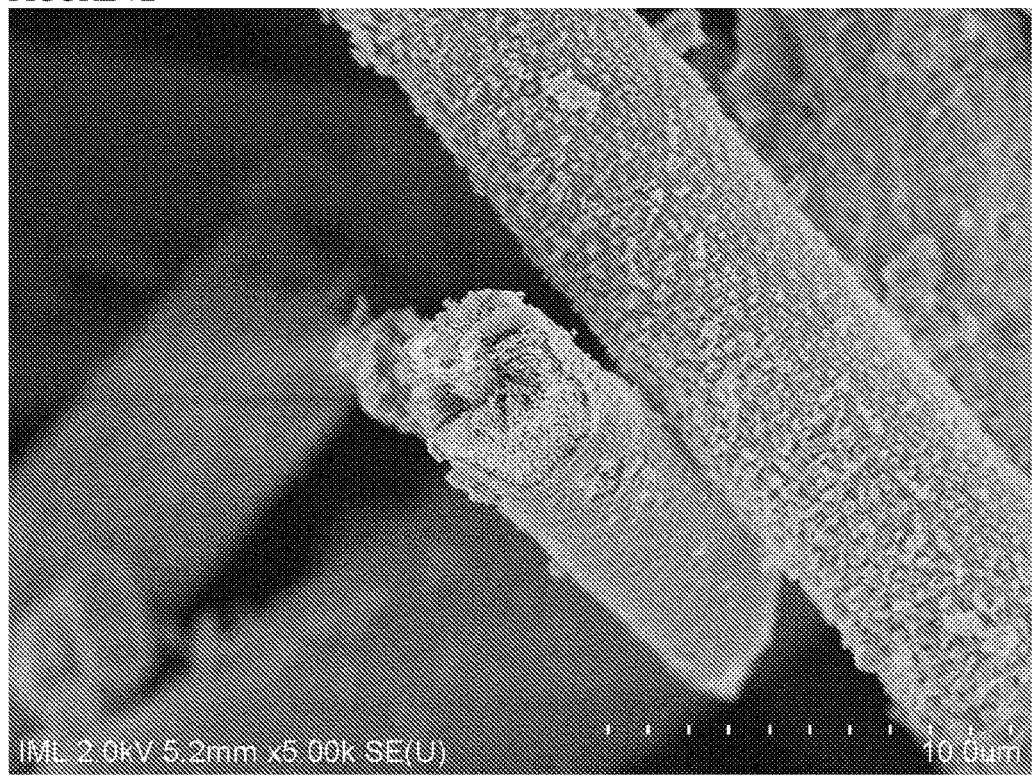
FIG. 7B is a SEM image of individual fibres of quartz wool starting material S1-1 following full reduction and HCl treatment.

FIG. 7B is a SEM image of an individual fibre having a diameter of 4 microns of quartz wool starting material S1-1 following reduction and HCl washing. The reaction conditions used in forming this product resulted in reduction of the starting material throughout the bulk of the fibre, leaving no observable silica core.

Figure 7C:
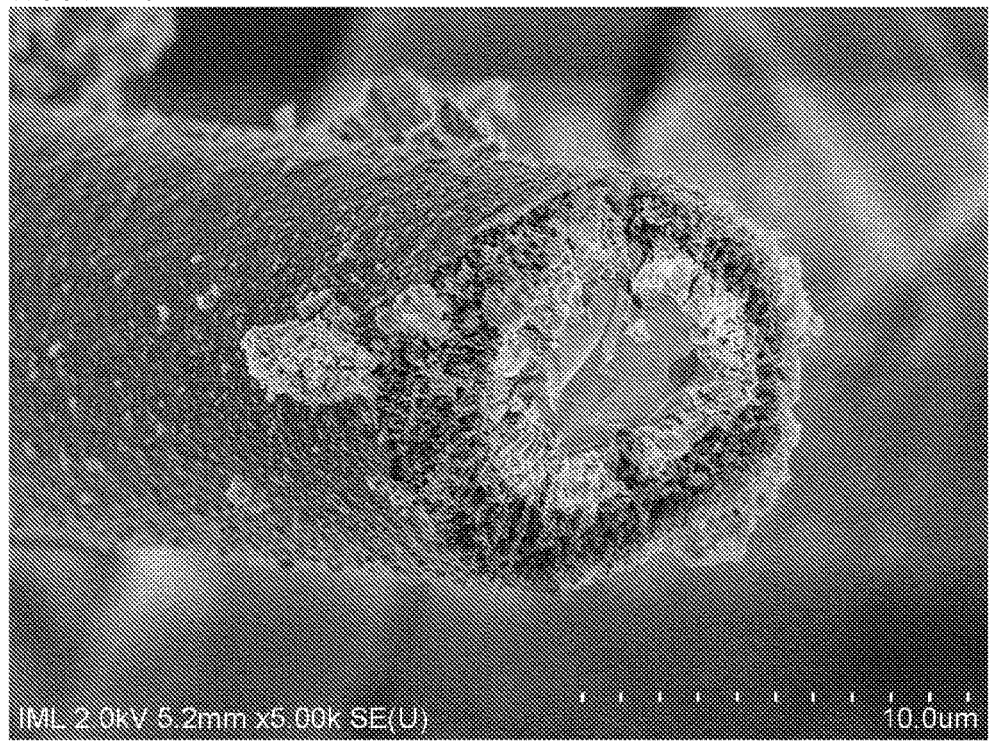
FIG. 7C is a SEM image of an individual fibre of quartz wool starting material S1-1 following partial reduction and HCl treatment.
Figure 7D:
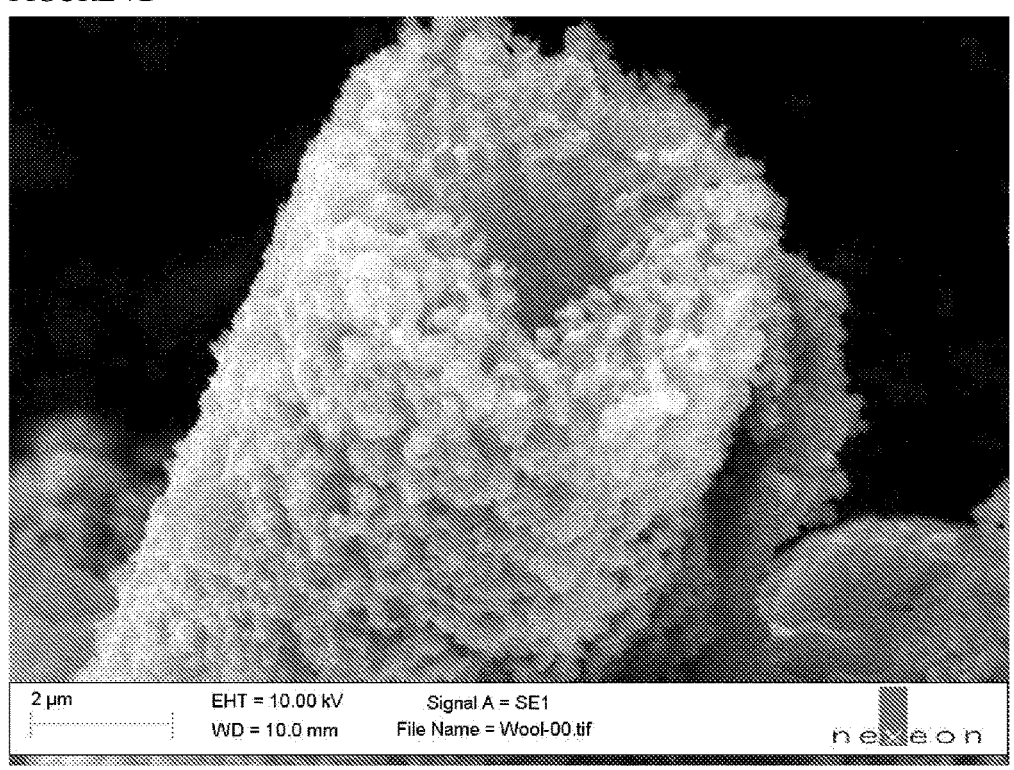
FIG. 7D is a SEM image of an individual fibre of quartz wool starting material S1-1 following reduction, HCl treatment and removal of remaining silica.

FIG. 7C is a SEM image of an individual fibre of quartz wool starting material S1-1 following reduction and HCl washing. The fibre has a non-porous core of unreacted silica and a porous surface formed by reduction of silica at the surface of the starting material. The diameter of the fibre of FIG. 7C is 11 microns, and the reaction conditions used in forming this product resulted in reduction of the starting material to a depth of about 3-4 microns. The unreacted core of silica is removed upon HF treatment, as shown in FIG. 7D, to leave a silicon tube.

Figure 8:
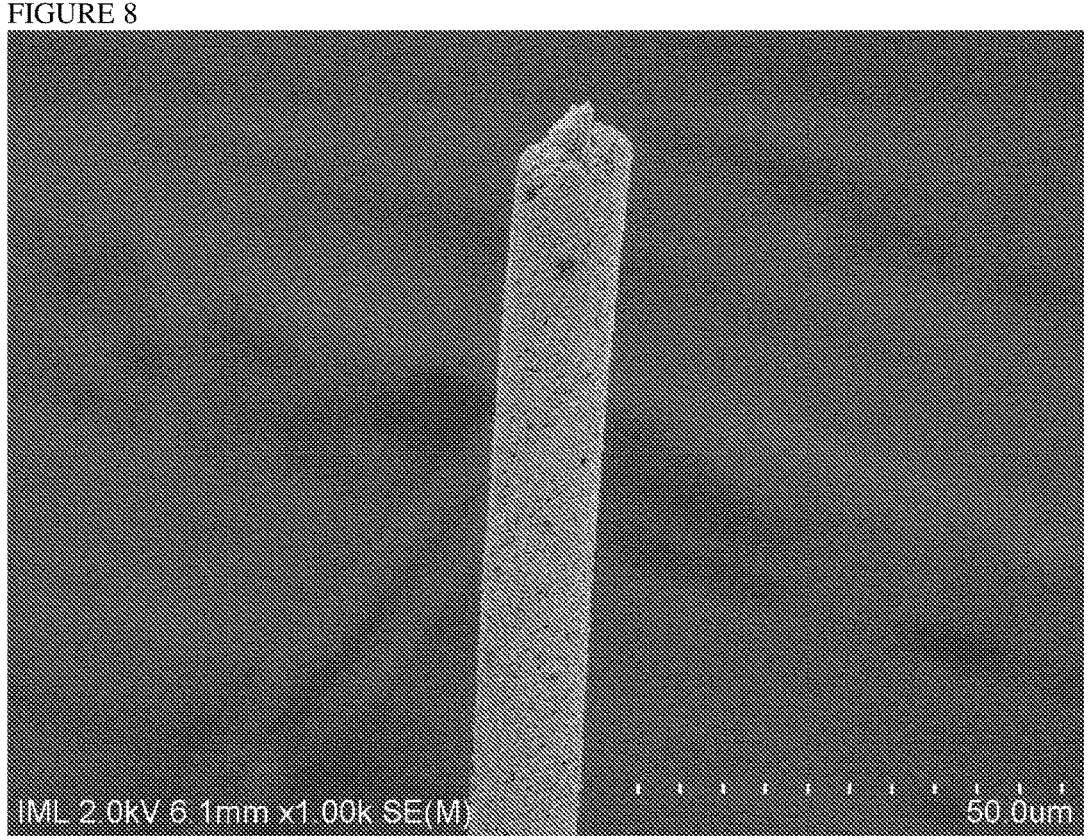
FIG. 8 is a SEM image of an individual fibre of the mat starting material S1-2 following reduction and HCl treatment.
Figure 9E:
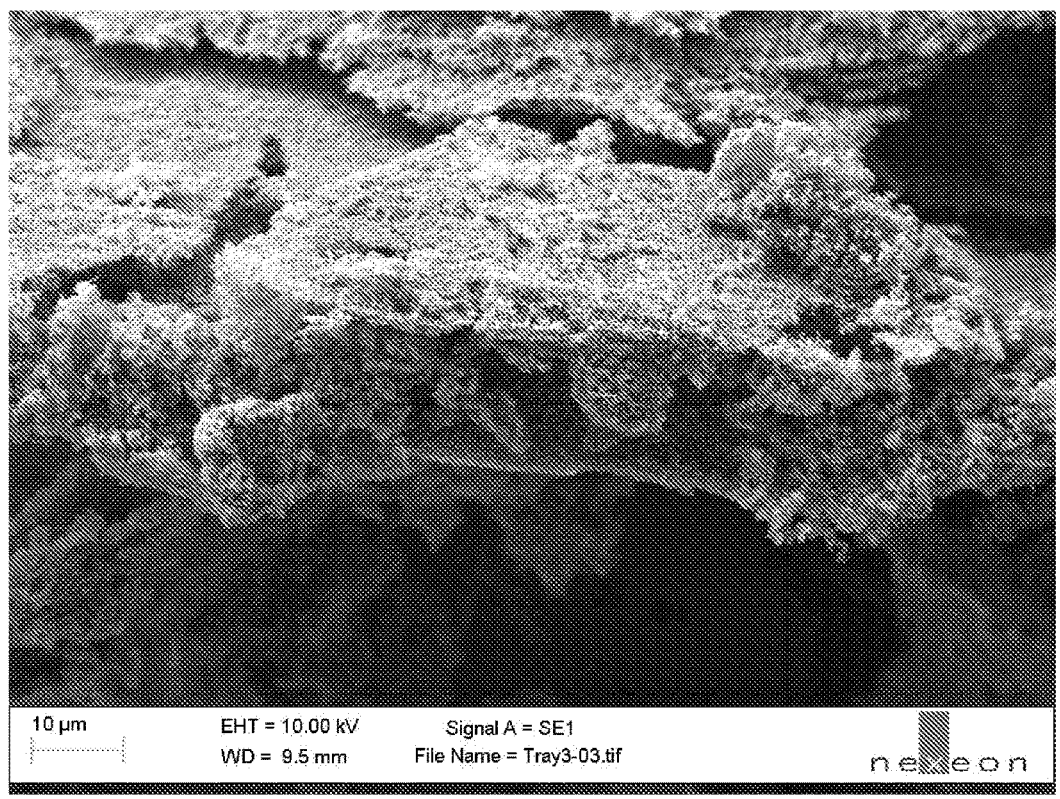
FIG. 9E is a SEM image of an edge of an individual flake of glass flake starting material S3 following reduction and HCl and HF treatment.

FIG. 8 is a SEM image of an individual fibre having a diameter of 13 microns of the needlemat starting material S1-2 following reduction. The fibre is completely reduced; there is no unreacted core, showing that the reaction conditions used in forming this product were sufficient to reduce the starting material to a depth of at least about 6-7 microns FIGS. 9A and 9B are a SEM images of glass flake starting material S3 before and after reduction respectively from FIG. 9E is a SEM image of an edge of an individual flake of glass flake starting material S3 of about 15 micron thickness from example 3-2 following reduction and HCl and HF treatment. A hollow area is apparent indicating that silica at the core of the flake remained unreacted in the reaction conditions used and was removed during HF treatment.

An EDX measurement of a silicon flake particle from Example 3-1 after reduction, HCl treatment and HF treatment was collected on an X-max 80 device from Oxford Instruments attached to the SEM and operating at an accelerated voltage of 20 KV and a working distance of 8 mm. After removing the spectral signals for carbon (which comes from the sample mount), fluorine (from the HF treatment) and oxygen (which is strongly influenced by the atmosphere within the sample chamber, the mass percentages of the detected elements were:
Silicon—88.5 wt %
Magnesium—9 wt %
Aluminium—2.5 wt %

Example 4

Silicon from Reduction of Electrospun Silica

Silica nanofibers of diameter 100-200 nm were prepared by electrospinning, as described in "Preparation of ultrafine silica fibers using electrospun PVA/silatrane composite fibers as precursor." M. Krissanasaeranee et al. J. Am. Ceram. Soc. 91,2830-5 (2008). The resulting silica mesh was then rotor milled to generate a nanofibrous powder with a d50 fibre length in the range 1-20 microns. The silica powder was then blended with magnesium powder in the molar ratio 1:2 ($SiO_2$:Mg). The silica/magnesium blend was then mixed with milled sodium chloride powder in, for example, a ratio of NaCl to the silica/magnesium blend of 1:1 by weight, which equates to a Mg:SiO$_2$:NaCl molar ratio of 2:1:1. Using a belt furnace, the blends were dried and then heat treated in argon at temperatures in the range 500-800° C., depending on the level of reduction required and batch size. The temperature of the reactant batch will depend upon a number of factors and is preferably monitored for process control. The reduced powder is leached in 20%-40% HCl at 50-80° C. for 1-5 hours, and then rinsed in water for 1-5 hours, depending on the silicon purity required.

Example 5

Silicon from Reduction of Biogenic Silica

Samples of marine sponge such as euplectella aspergillum were rotor milled to a d50 particle size of 20-50 microns. The powder was subjected to HCl, water rinsing, drying and calcination treatments (e.g. 500° C. in air for 2 hours) to remove residual organic phases. The biogenic silica feedstock powder was then processed as in the above embodiment, for conversion into a powder of mesh-like interconnected silicon fibres.

The inventors have discovered that the methods described herein can produce particulate silicon materials comprising structural elements with high aspect ratios (for example at least 3:1) and small minor dimensions (for example a smallest dimension less than 10 microns or even less than 1 micron) in a process that is much more cost effective and scalable to large production amounts compared to existing methods for producing such silicon powders. Furthermore, they have discovered that the process can be controlled to produce hollow structures such as tubes or hollow flakes through partial reduction of the silica feedstock and removal of eth remaining silica core. Still further, they have discovered that the silicon product can be produced using the methods described herein, with a moderate to low specific surface area characterized by the measured BET value, for example a BET value less than 50 m$^2$/g. Such silicon materials may be used in various different applications but they are especially suitable for use as the active component of an electrode in an electrochemical cell, especially as an active component in the anode of a rechargeable metal ion cell such as a lithium-ion cell anode. The low BET value keeps the first cycle capacity loss caused by formation of the SEI layer in such cells to a minimum and the dimensions and shape of the structural silicon elements provide improved cycling performance during charging and recharging and help to maintain electronic connectivity between the components of the electrode. Particles with hollow cores may also further improve performance in such cells by providing an internal void space into which the silicon material can expand during charging to reduce overall expansion in the thickness of the electrode composite. If the particles are suitably further treated to enclose the hollow core so that it is not in contact with the organic solvents of the cell electrolyte during use, then the first cycle losses may be further reduced.

Although the present invention has been described in terms of specific exemplary embodiments, it will be appreciated that various modifications, alterations and/or combinations of features disclosed herein will be apparent to those skilled in the art without departing from the scope of the invention as set forth in the following claims.

The invention claimed is:

1. A method of forming a particulate material comprising silicon, the method comprising steps of:
   reducing a particulate starting material comprising silica-containing particles having an aspect ratio of at least 3:1 and a smallest dimension of less than 15 microns to form a particulate material comprising silicon; or
   reducing a particulate starting material comprising silica-containing particles comprising a plurality of elongate structural elements, each elongate structural element having an aspect ratio of at least 3:1 and a smallest dimension of less than 15 microns to form a particulate material comprising silicon;
   wherein the reduction takes place in the presence of a thermal moderator, and
   wherein the particulate material comprising silicon has a BET value of less than 100 m$^2$/g after removal of by-products of the reduction.

2. The method according to claim 1, wherein the aspect ratio of the silica-containing particles or of the elongate structural elements is at least 5:1 and/or wherein the smallest dimension of the silica-containing particles or of the elongate structural elements is less than 10 microns.

3. The method according to claim 2, wherein the smallest dimension of the silica-containing particles or of the elongate structural elements is less than 3 microns.

4. The method according to claim 1, wherein substantially all silica of the starting material is reduced.

5. The method according to claim 1, wherein the geometric surface area of the silicon material is substantially the same as the geometric surface area of the starting material and/or wherein the shape of the particles of the material comprising silicon is substantially the same as the shape of the starting material particles.

6. The method according to claim 1, wherein silica at a surface of the starting material particles is reduced and silica at a core of the starting material particles is not reduced.

7. The method according to claim 6, wherein the silica at the core is selectively removed.

8. The method according to claim 6, wherein the silica at the core is selectively removed by exposure to HF.

9. The method according to claim 6, wherein the particulate material comprising silicon formed following selective removal of silica is a flake having a hollow core, or a tube.

10. The method according to claim 6, wherein the geometric surface area of the material comprising silicon is greater than the geometric surface area of the starting material.

11. The method according to claim 1, wherein the starting material is n- or p-doped or wherein the starting material is undoped.

12. The method according to claim 1, wherein the starting material particles have an open framework structure.

13. The method according to claim 1, wherein the starting material is reduced at a reaction temperature of no more than 750° C.

14. The method according to claim 1, wherein the starting material is reduced by exposure to liquid metal or metal vapour.

15. The method according to claim 14, wherein the metal is magnesium or calcium.

16. The method according to claim 14, wherein the thermal moderator is a salt, and wherein the thermal moderator is mixed with the starting material and a reducing agent or wherein a layer of thermal moderator is in contact with the starting material.

17. The method according to claim 1, wherein the silica is reduced by exposure to a reducing composition that causes both reduction of the silica and doping of the silicon.

18. The method according to claim 1, comprising a further step of coating at least part of the surface of the material comprising silicon.

19. The method according to claim 1, wherein the starting material is formed by electrospinning silica or wherein the starting material is biogenic silica.

20. The method according to claim 1, wherein the material comprising silicon has a BET value that is the same as or less than a BET value of the starting material.

21. The method according to claim 1, wherein the material comprising silicon has a BET value of less than 50 $m^2/g$.

22. The method according to claim 1, wherein the starting material is no more than 95% silica by weight.

23. The method according to claim 1, wherein the particulate material comprising silicon is treated to remove reaction by-products.

24. The method according to claim 23, wherein the reaction by-products are removed by HCl treatment.

25. The method according to claim 1, wherein the particulate material comprising silicon is etched to form silicon pillars extending from a silicon core of the particulate material.

26. The method according to claim 1, wherein the particulate starting material comprises microcrystalline, nanocrystalline, or amorphous silica and wherein the material comprising silicon comprises microcrystalline or nanocrystalline silicon.

27. The method according to claim 1, wherein the reducing takes place at a reaction temperature at which the starting material is reduced, and wherein the particulate starting material comprises silica with a softening temperature that is lower than the reaction temperature and a melting temperature that is higher than the reaction temperature.

28. The method according to claim 1, wherein the starting material is heated to a reaction temperature of 650-725° C. at a heating rate of 5-15° C. per minute, held at the reaction temperature for 30-150 minutes and cooled down to room temperature at a rate of 5-15° C. per minute.

29. The method according to claim 1, wherein the silica starting material comprises impurities selected from: (1) carbon in an amount of up to 10 wt %; and (2) Li, Na, Mg, Zn, Al, Ti, Ca, B or oxides thereof, wherein each metal oxide is present in an amount of no more than 20 wt %, and wherein the total amount of all metal oxides is no more than 45 wt %.

30. The method according to claim 1, wherein the starting material is reduced at a reaction temperature of no more than 650° C.

31. The method according to claim 1, comprising a further step of coating at least part of the surface of the material comprising silicon with silicon oxide or carbon.

32. The method according to claim 1, wherein the starting material is no more than 90% silica by weight.

33. The method according to claim 1, wherein the particulate material comprising silicon is etched by metal-assisted chemical etching to form silicon pillars extending from a silicon core of the particulate material.

* * * * *